(12) United States Patent
Smith et al.

(10) Patent No.: US 9,438,342 B2
(45) Date of Patent: Sep. 6, 2016

(54) METHODS, SYSTEMS, AND DEVICES FOR INTEGRATING WIRELESS TECHNOLOGY INTO A FIBER OPTIC NETWORK

(71) Applicant: ADC Telecommunications, Inc., Berwyn, PA (US)

(72) Inventors: Trevor D. Smith, Eden Prairie, MN (US); Yu Lu, Eden Prairie, MN (US); Wayne M. Kachmar, North Bennington, VT (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/589,648

(22) Filed: Jan. 5, 2015

(65) Prior Publication Data

US 2015/0155940 A1 Jun. 4, 2015

Related U.S. Application Data

(63) Continuation of application No. 13/965,928, filed on Aug. 13, 2013, now Pat. No. 8,929,740, which is a continuation of application No. 12/718,818, filed on Mar. 5, 2010, now Pat. No. 8,532,490.

(60) Provisional application No. 61/157,710, filed on Mar. 5, 2009.

(51) Int. Cl.
*H04B 10/2575* (2013.01)
*H04B 10/27* (2013.01)
(Continued)

(52) U.S. Cl.
CPC .......... *H04B 10/25* (2013.01); *H04B 10/2575* (2013.01); *H04B 10/25754* (2013.01);
(Continued)

(58) Field of Classification Search
CPC ...... H04B 10/25; H04B 10/27; H04B 10/40; H04B 10/808; H04B 10/2575; H04B 10/25754; H04J 14/0282; G02B 6/4472; G02B 6/3825; G02B 6/4416
USPC .................................. 398/66, 104, 105, 171
See application file for complete search history.

(56) References Cited

U.S. PATENT DOCUMENTS

| 4,365,865 A | 12/1982 | Stiles |
| 4,420,220 A | 12/1983 | Dean et al. |

(Continued)

FOREIGN PATENT DOCUMENTS

| CN | 1980173 A | 6/2007 |
| CN | 201352702 Y | 11/2009 |

(Continued)

OTHER PUBLICATIONS

Above Ground Level (AGL) magazine; dated Jul. 2006 (vol. 3, No. 4) and Aug./Sep. 2006 (vol. 3, No. 5); pp. 1-8.

(Continued)

*Primary Examiner* — Dalzid Singh
(74) *Attorney, Agent, or Firm* — Merchant & Gould P.C.

(57) ABSTRACT

The present disclosure relates to a fiber optic network configuration having an optical network terminal located at a subscriber location. The fiber optic network configuration also includes a drop terminal located outside the subscriber location and a wireless transceiver located outside the subscriber location. The fiber optic network further includes a cabling arrangement including a first signal line that extends from the drop terminal to the optical network terminal, a second signal line that extends from the optical network terminal to the wireless transceiver, and a power line that extends from the optical network terminal to the wireless transceiver.

15 Claims, 19 Drawing Sheets

(51) Int. Cl.
*H04B 10/40* (2013.01)
*H04B 10/80* (2013.01)
*H04J 14/02* (2006.01)
*G02B 6/38* (2006.01)
*G02B 6/44* (2006.01)
*H04B 10/25* (2013.01)

(52) U.S. Cl.
CPC ............ *H04B 10/27* (2013.01); *H04B 10/40* (2013.01); *H04B 10/808* (2013.01); *H04J 14/0282* (2013.01); *G02B 6/3825* (2013.01); *G02B 6/4416* (2013.01); *G02B 6/4472* (2013.01)

(56) References Cited

U.S. PATENT DOCUMENTS

| | | |
|---|---|---|
| 4,497,537 A | 2/1985 | Dench |
| 4,552,432 A | 11/1985 | Anderson et al. |
| 4,695,127 A | 9/1987 | Ohlhaber et al. |
| 4,723,832 A | 2/1988 | Okazato et al. |
| 4,787,705 A | 11/1988 | Shinmoto et al. |
| 4,867,527 A | 9/1989 | Dotti et al. |
| 4,895,426 A | 1/1990 | Pinson |
| 5,125,060 A | 6/1992 | Edmundson |
| 5,268,971 A | 12/1993 | Nilsson et al. |
| 5,317,663 A | 5/1994 | Beard et al. |
| 5,469,523 A | 11/1995 | Blew et al. |
| 5,539,851 A | 7/1996 | Taylor et al. |
| 5,555,336 A | 9/1996 | Winslow |
| 5,555,338 A | 9/1996 | Haag et al. |
| 5,557,698 A | 9/1996 | Gareis et al. |
| 5,651,081 A | 7/1997 | Blew et al. |
| 5,677,974 A | 10/1997 | Elms et al. |
| 5,699,176 A | 12/1997 | Cohen |
| 5,745,627 A | 4/1998 | Arroyo et al. |
| 5,778,122 A | 7/1998 | Giebel et al. |
| 5,864,672 A | 1/1999 | Bodeep et al. |
| 5,880,865 A | 3/1999 | Lu et al. |
| 5,913,003 A | 6/1999 | Arroyo et al. |
| 5,946,617 A | 8/1999 | Portaro et al. |
| 5,966,489 A | 10/1999 | Harwell et al. |
| 5,997,186 A | 12/1999 | Huynh et al. |
| RE36,592 E | 2/2000 | Giebel et al. |
| 6,104,855 A | 8/2000 | Jeon |
| 6,169,834 B1 | 1/2001 | Keller |
| 6,195,487 B1 | 2/2001 | Anderson et al. |
| 6,236,789 B1 | 5/2001 | Fitz |
| 6,343,172 B1 | 1/2002 | Schiestle et al. |
| 6,363,192 B1 | 3/2002 | Spooner |
| 6,463,198 B1 | 10/2002 | Coleman et al. |
| 6,546,175 B1 | 4/2003 | Wagman et al. |
| 6,567,592 B1 | 5/2003 | Gimblet et al. |
| 6,599,025 B1 | 7/2003 | Deutsch |
| 6,668,127 B1 | 12/2003 | Mahony |
| 6,674,966 B1 | 1/2004 | Koonen |
| 6,687,437 B1 | 2/2004 | Starnes et al. |
| 6,714,710 B2 | 3/2004 | Gimblet |
| 6,719,461 B2 | 4/2004 | Cull |
| 6,738,547 B2 | 5/2004 | Spooner |
| 6,755,575 B2 | 6/2004 | Kronlund et al. |
| 6,758,693 B2 | 7/2004 | Inagaki et al. |
| 6,785,450 B2 | 8/2004 | Wagman et al. |
| 6,796,821 B2 | 9/2004 | Cairns et al. |
| 6,847,767 B2 | 1/2005 | Hurley et al. |
| 6,885,674 B2 | 4/2005 | Hunt et al. |
| 6,895,185 B1 | 5/2005 | Chung et al. |
| 6,899,467 B2 | 5/2005 | McDonald et al. |
| 6,931,183 B2 | 8/2005 | Panak et al. |
| 6,965,718 B2 | 11/2005 | Koertel |
| 6,983,095 B2 | 1/2006 | Reagan et al. |
| 7,006,740 B1 | 2/2006 | Parris |
| 7,035,513 B2 | 4/2006 | Mohler et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,120,347 B2 | 10/2006 | Blackwell, Jr. et al. |
| 7,158,703 B2 | 1/2007 | Mjelstad |
| 7,198,409 B2 | 4/2007 | Smith et al. |
| 7,233,731 B2 | 6/2007 | Solheid et al. |
| 7,272,281 B2 | 9/2007 | Stahulak et al. |
| 7,277,614 B2 | 10/2007 | Cody et al. |
| 7,292,763 B2 | 11/2007 | Smith et al. |
| 7,310,430 B1 | 12/2007 | Mallya et al. |
| 7,349,605 B2 | 3/2008 | Noonan et al. |
| 7,362,936 B2 | 4/2008 | Stark et al. |
| 7,371,014 B2 * | 5/2008 | Willis ................ G02B 6/3887 385/24 |
| 7,397,997 B2 | 7/2008 | Ferris et al. |
| 7,400,815 B2 | 7/2008 | Mertesdorf et al. |
| 7,401,985 B2 | 7/2008 | Aronson et al. |
| 7,409,127 B1 | 8/2008 | Hurley et al. |
| 7,418,181 B2 | 8/2008 | Zimmel et al. |
| 7,428,366 B2 | 9/2008 | Mullaney et al. |
| 7,445,389 B2 | 11/2008 | Aronson |
| 7,489,849 B2 | 2/2009 | Reagan et al. |
| 7,494,287 B2 | 2/2009 | Wang et al. |
| 7,499,616 B2 | 3/2009 | Aronson et al. |
| 7,565,055 B2 | 7/2009 | Lu et al. |
| 7,572,065 B2 | 8/2009 | Lu et al. |
| 7,591,595 B2 | 9/2009 | Lu et al. |
| 7,627,222 B2 | 12/2009 | Reagan et al. |
| 7,643,713 B2 | 1/2010 | Buthe et al. |
| 7,680,388 B2 * | 3/2010 | Reagan ................ G02B 6/3897 385/139 |
| 7,686,519 B2 | 3/2010 | Lu |
| 7,692,098 B2 | 4/2010 | Wyatt, II et al. |
| 7,712,976 B2 | 5/2010 | Aronson et al. |
| 7,720,343 B2 | 5/2010 | Barth et al. |
| 7,740,409 B2 | 6/2010 | Bolton et al. |
| 7,744,288 B2 | 6/2010 | Lu et al. |
| 7,751,672 B2 | 7/2010 | Smith et al. |
| 7,762,727 B2 | 7/2010 | Aronson |
| 7,778,510 B2 | 8/2010 | Aronson et al. |
| 7,816,602 B2 | 10/2010 | Landry et al. |
| 7,844,158 B2 | 11/2010 | Gronvall et al. |
| 7,869,681 B2 | 1/2011 | Battey et al. |
| 7,873,255 B2 | 1/2011 | Reagan et al. |
| 7,876,989 B2 | 1/2011 | Aronson et al. |
| 7,897,873 B2 | 3/2011 | Gemme et al. |
| 8,041,178 B2 | 10/2011 | Lu et al. |
| 8,060,081 B2 | 11/2011 | Owens et al. |
| 8,083,417 B2 | 12/2011 | Aronson et al. |
| 8,144,646 B2 | 3/2012 | Zha et al. |
| 8,155,525 B2 | 4/2012 | Cox |
| 8,175,433 B2 | 5/2012 | Caldwell et al. |
| 8,204,348 B2 | 6/2012 | Keller et al. |
| 8,244,087 B2 | 8/2012 | Sales Casals et al. |
| 8,249,410 B2 | 8/2012 | Andrus et al. |
| 8,254,740 B2 | 8/2012 | Smith et al. |
| 8,270,838 B2 | 9/2012 | Cox |
| 8,297,854 B2 | 10/2012 | Bickham et al. |
| 8,301,003 B2 | 10/2012 | de los Santos Campos et al. |
| 8,328,433 B2 | 12/2012 | Furuyama |
| 8,532,490 B2 | 9/2013 | Smith et al. |
| 8,842,954 B2 | 9/2014 | Burris et al. |
| 8,929,740 B2 | 1/2015 | Smith et al. |
| 8,948,557 B2 | 2/2015 | Islam |
| 9,057,862 B2 | 6/2015 | Strasser et al. |
| 9,069,151 B2 | 6/2015 | Conner |
| 9,078,287 B2 | 7/2015 | Khemakhem et al. |
| 2002/0136510 A1 | 9/2002 | Heinz et al. |
| 2003/0215197 A1 | 11/2003 | Simon et al. |
| 2005/0094959 A1 | 5/2005 | Sibley et al. |
| 2005/0172328 A1 | 8/2005 | Park et al. |
| 2005/0213921 A1 | 9/2005 | Mertesdorf et al. |
| 2005/0220421 A1 | 10/2005 | Keenum et al. |
| 2005/0259928 A1 | 11/2005 | Elkins, II et al. |
| 2005/0266854 A1 | 12/2005 | Niiho et al. |
| 2006/0127026 A1 | 6/2006 | Beck |
| 2006/0133758 A1 * | 6/2006 | Mullaney ................ G02B 6/3825 385/139 |
| 2006/0147172 A1 | 7/2006 | Luther et al. |

(56) References Cited

U.S. PATENT DOCUMENTS

| | | |
|---|---|---|
| 2006/0269208 A1 | 11/2006 | Allen et al. |
| 2006/0291787 A1 | 12/2006 | Seddon |
| 2007/0065089 A1 | 3/2007 | Matsuoka et al. |
| 2007/0110026 A1 | 5/2007 | Sinha et al. |
| 2007/0269170 A1* | 11/2007 | Easton .............. G02B 6/4416 385/101 |
| 2008/0025725 A1 | 1/2008 | Jette et al. |
| 2008/0037941 A1 | 2/2008 | Mallya et al. |
| 2008/0159744 A1 | 7/2008 | Soto et al. |
| 2008/0310796 A1 | 12/2008 | Lu |
| 2008/0310848 A1* | 12/2008 | Yasuda .............. G02B 6/4416 398/115 |
| 2009/0060531 A1 | 3/2009 | Biegert et al. |
| 2009/0148101 A1 | 6/2009 | Lu et al. |
| 2009/0162016 A1 | 6/2009 | Lu et al. |
| 2009/0245805 A1 | 10/2009 | Akasaka et al. |
| 2009/0269013 A1 | 10/2009 | Durand et al. |
| 2009/0317047 A1* | 12/2009 | Smith .............. G02B 6/4452 385/135 |
| 2010/0014868 A1 | 1/2010 | McGlynn et al. |
| 2010/0200270 A1 | 8/2010 | Gemme et al. |
| 2011/0216751 A1 | 9/2011 | Bianchi et al. |
| 2011/0280527 A1 | 11/2011 | Tamura |
| 2011/0293227 A1 | 12/2011 | Wu |
| 2011/0311191 A1 | 12/2011 | Hayashishita et al. |
| 2012/0008904 A1 | 1/2012 | Han et al. |
| 2012/0008905 A1 | 1/2012 | Han et al. |
| 2012/0008906 A1 | 1/2012 | Han et al. |
| 2012/0057821 A1* | 3/2012 | Aronson .............. G02B 6/3817 385/39 |
| 2012/0080225 A1 | 4/2012 | Kim et al. |
| 2012/0114288 A1 | 5/2012 | Wu |
| 2012/0191997 A1 | 7/2012 | Miller |
| 2012/0281952 A1 | 11/2012 | McColloch |
| 2012/0281953 A1 | 11/2012 | Choi et al. |
| 2012/0288245 A1 | 11/2012 | Hurley et al. |
| 2013/0011106 A1 | 1/2013 | Congdon, II et al. |
| 2013/0022318 A1 | 1/2013 | Fingler et al. |
| 2013/0146355 A1 | 6/2013 | Strasser et al. |
| 2013/0294735 A1 | 11/2013 | Burris et al. |
| 2014/0219621 A1 | 8/2014 | Barnette, Jr. et al. |
| 2014/0241670 A1 | 8/2014 | Barnette, Jr. et al. |

FOREIGN PATENT DOCUMENTS

| | | |
|---|---|---|
| DE | 100 08 613 A1 | 9/2001 |
| EP | 0 189 609 B1 | 5/1990 |
| EP | 1 959 614 A1 | 8/2008 |
| EP | 2 253 980 A1 | 11/2010 |
| EP | 2 330 707 A1 | 6/2011 |
| JP | 60-169813 | 9/1985 |
| WO | WO 2006/113726 A1 | 10/2006 |
| WO | WO 2007/062606 A1 | 6/2007 |
| WO | WO 2014/123940 A1 | 8/2014 |

OTHER PUBLICATIONS

Broadband Properties *You Don't Know Jack?*; dated Jun. 2005; pp. 26-29.
Corning Cable Systems Evolant® *Solutions for Wireless Networks*; dated Sep. 2006; pp. 1-6.
European Patent Office, Communication, Extended European Search Report dated Nov. 12, 2014; 9 pp.
International Search Report and Written Opinion mailed Sep. 27, 2010.
Webopedia "CO"; dated Apr. 23, 2008; pp. 1-4.
Wikipedia "Fiber to the premises (FTTP)"; dated Apr. 15, 2008; pp. 1-4.
Wikipedia "Fiber to the x (FTTX)"; dated Apr. 15, 2008; pp. 1-4.
Wikipedia "local loop"; dated Apr. 16, 2008; pp. 1-2.
Wikipedia "Local-Area Network"; dated Apr. 18, 2008; pp. 1-3.
Wikipedia "Voice over Internet Protocol (VoIP)"; dated Apr. 18, 2008; pp. 1-14.
Wikipedia "Wireless local loop (WLL)"; dated Apr. 16, 2008; pp. 1-6.
Wikipedia *Network Operations Center*; dated Apr. 23, 2008; pp. 1-2.
Fanout/Breakout Cables, http://www.fibertronics-store.com/Fanout-Breakout-Cables_c35.htm, 4 pages. (Copyright 2011-2015).
FTTA Fiber to the Antenna Brochure, 4 pages (2012).
International Search Report for International Application No. PCT/IB2014/060209 mailed Jul. 23, 2014 (2 pages).
International Written Opinion for International Application No. PCT/IB2014/060209 mailed Jul. 23, 2014 (4 pages).
MPO Connector Family (Multifiber Push-On), 4 page (Copyright 2014).
MPO Connector Patch Cord, http://www.furukawa.co.jp/connector/mpo.htm, 3 pages (Copyright 2011).
MPO Patch Cord/Fan-out Cord, http://web.archive.org/web/20020602154736/http:/www.furukawa.co.jp/connector/mpo.htm, 4 pages (Copyright 2001).
Siecor Back-fed Cable Stub Installation, Siecor Recommended Procedure SRP-009-002 Issue 1, pp. 1-3 (Jan. 1993).
Siecor Front-fed Cable Stub Installation, Siecor Recommended Procedure SRP-009-003 Issue 1, pp. 1-4 (Apr. 1993).

* cited by examiner

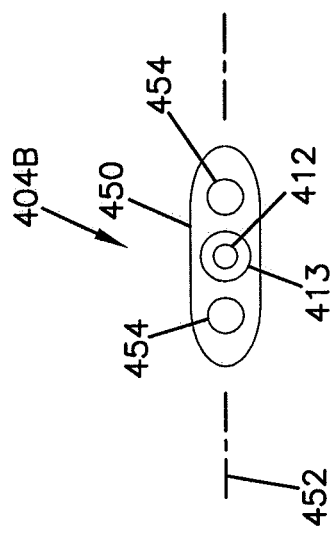
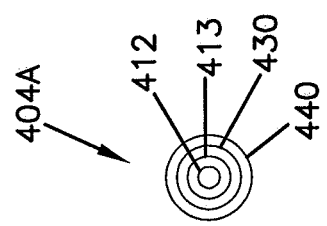

METHODS, SYSTEMS, AND DEVICES FOR INTEGRATING WIRELESS TECHNOLOGY INTO A FIBER OPTIC NETWORK

CROSS REFERENCE TO RELATED APPLICATIONS

This application is a continuation of application Ser. No. 13/965,928, filed Aug. 13, 2013, now U.S. Pat. No. 8,929,740, which is a continuation of application Ser. No. 12/718,818, filed Mar. 5, 2010, now U.S. Pat. No. 8,532,490, which application claims the benefit of provisional application Ser. No. 61/157,710, filed Mar. 5, 2009, each entitled "Methods, Systems and Devices for Integrating Wireless Technology into a Fiber Optic Network," and which applications are incorporated herein by reference in their entireties.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals in one direction and convert electrical signals to optical signals in the opposite direction. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into electrical signals for use with the subscriber's devices. However, to the extent that an end user may have devices that are compatible with optical signals, conversion of the optical signals to electrical signals may not be necessary.

FTTP networks include active optical networks and passive optical networks. Active optical networks use electrically powered equipment (e.g., switches, routers, multiplexers or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

SUMMARY

Features of the present disclosure relate to methods, systems and devices for incorporating or integrating wireless technology into a fiber optic distribution network. In one embodiment, wireless technology is incorporated into an FTTP network.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

FIG. 17 is a cross-sectional view taken along section line 17-17 of FIG. 10 showing another branch section for the cable configuration of FIG. 10;

FIG. 18 is a cross-sectional view taken along section line 17-17 of FIG. 10 showing a further branch section that can be used for the cable configuration of FIG. 10;

DETAILED DESCRIPTION

A. Example Network

Figure 1:
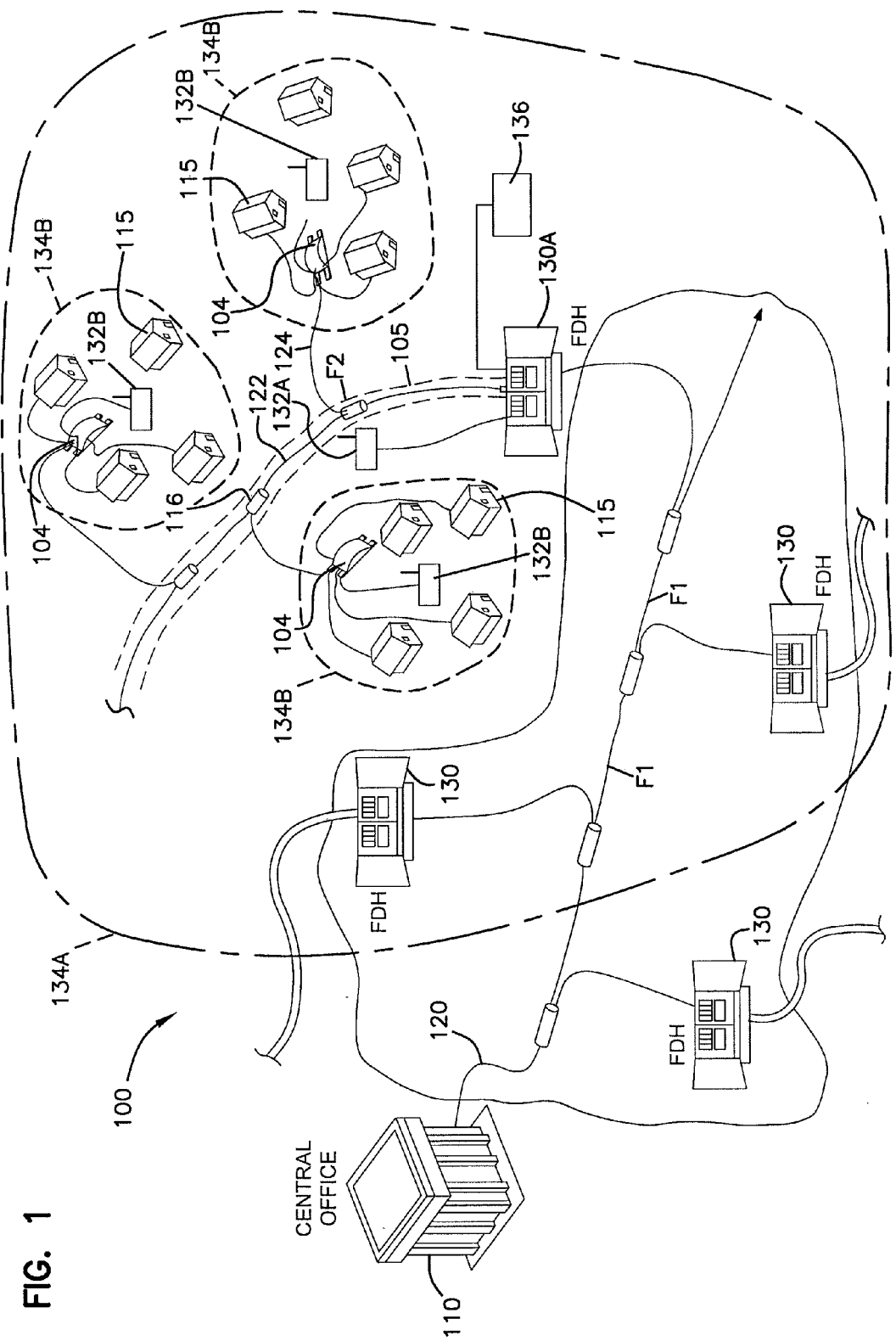
FIG. 1 is a schematic view of a fiber optic network in accordance with the principles of the present disclosure.

FIG. 1 illustrates an exemplary passive optical network 100. As shown in FIG. 1, the network 100 is adapted to interconnect a central office 110 to a number of end subscribers 115 (also called end users 115 herein). The central office 110 may additionally connect to a larger network such as the Internet (not shown) and a public switched telephone network (PSTN). The various lines of the network can be aerial or housed within underground conduits (e.g., see conduit 105).

In general, the network 100 includes feeder distribution cables 120 routed from the central office 110. The feeder distribution cables 120 often include a main cable or trunk, and a plurality of branch cables that branch from the main cable. The portion of network 100 that is closest to central office 110 is generally referred to as the F1 region. The F1 region of the network may include a feeder cable (i.e., an F1 distribution cable) having on the order of 12 to 48 fibers; however, alternative implementations may include fewer or more fibers. The network 100 also has an F2 region that includes cables and components located in closer proximity to the subscribers/end users 115.

The network 100 also may include fiber distribution hubs (FDHs) 130 that receive branch cables of the feeder distribution cable 120 and that output one or more F2 distribution cables 122. In general, an FDH 130 is an equipment enclosure that may include a plurality of passive optical splitters (e.g., 1-to-8 splitters, 1-to-16 splitters, or 1-to-32 splitters) for splitting the incoming feeder fibers into a number (e.g., 216, 432, etc.) of output distribution fibers corresponding to optical fibers of the F2 distribution cables 122. The F2 distribution cables are routed from the FDH 130 to locations in close proximity to the end users 115.

The F2 distribution cables 122 can have a variety of different type of configurations. As depicted at FIG. 1, the F2 distribution cables include a plurality of breakout locations 116 at which branch cables (e.g., drop cables, stub cables, etc.) are separated out from and optically coupled to trunks of the distribution cables 122. Breakout locations 116 also can be referred to as tap locations or branch locations and branch cables also can be referred to as breakout cables or tethers. At a breakout location, fibers of the trunk of the distribution cable can be broken out and connectorized to form a connectorized tether. In other embodiments, fibers of the trunk can be broken out and spliced to a length of optical fiber having a connectorized free end so as to form a connectorized tether.

Stub cables are typically branch cables that are routed from breakout locations 116 to intermediate access locations, such as a pedestals, drop terminals 104 or hubs. Intermediate access locations can provide connector interfaces located between breakout locations 116 and the subscriber locations 115. A drop cable is a cable that typically forms the last leg to a subscriber location 115. For example, drop cables can be routed from intermediate access locations to subscriber locations 115. Drop cables also can be routed directly from breakout locations 116 to subscriber locations 115, thereby bypassing any intermediate access locations.

In other embodiments, F2 distribution cable may not employ breakouts. Instead, an F2 distribution cable may be run from an FDH to a drop terminal such that one end of the F2 distribution cable is located at the FDH and the other end of the F2 distribution cable is located at the drop terminal. For such an embodiment, the F2 distribution cable may include the same number of optical fibers as the number of access ports provided on the drop terminal. For such an embodiment, an excess length of the F2 distribution cable can be stored on a spool provided at the drop terminal as described at U.S. Patent Application Ser. No. 61/098,494, which is hereby incorporated by reference.

FIG. 1 shows the network after installation of the distribution cables and drop terminals, but before installation of drop cables. Upon completion of the network, drop cables will typically be installed to form the final legs between the subscribers 115 and the intermediate locations (e.g., drop terminals 104) or between the subscribers 115 and the break out locations 116.

Referring still to FIG. 1, the depicted network is configured to allow service to be distributed to the network via wireless transmissions as well as hard connections (i.e., connections made to the network through a direct physical connection such as a co-axial cable, twisted pair cable, fiber optic cable or other type of cable). Wireless transmissions allow service to be provided to subscribers that are not hard connected to the network and also allow redundant service to be provided to subscribers that are hard connected to the network. As shown at FIG. 1, a wireless transceiver 132A is installed adjacent FDH 130A. The wireless transceiver 132A can be mounted inside the enclosure of the FDH 130A, or can be outside the enclosure of the FDH 130A. The wireless transceiver 132A has a coverage area 134A large enough to cover at least the portion of the network to which the FDH 130A provides hard service connections. In certain embodiments, the wireless transceiver 132A has a coverage area larger than the portion of the network to which the FDH 130A provides hard service connections. Power for the wireless transceiver 132A can be provided from a number of sources. For example, power can be metered from an adjacent utility. Alternatively, power can be provided by a battery located at or near the FDH 130A. Further, power can be provided by a solar panel 136 positioned on, at, or near the FDH 130A. In certain embodiments, the solar panel 136 can be used to re-charge a battery within the FDH enclosure that provides power to the wireless transceiver 132A.

Referring again to FIG. 1, wireless transceivers 132B are also mounted at or near the drop terminals 104 of the network. The wireless transceivers 132B have coverage areas 134B smaller than the coverage area 134A of the wireless transceiver 132A. The coverage areas 134B are shown within the coverage area 134A and each coverage area 134B corresponds in size generally with the portion of the network to which it corresponding drop terminals 104 is intended to provide hard service connections.

It will be appreciated that the wireless transceivers 132B include components for converting optical signals and/or electrical signals to wireless signals. The wireless transceivers 132B further includes components for transmitting the wireless signals to a predetermined transmission area, and for receiving wireless signals transmitted from transmitters within the wireless service area. The wireless transceiver can also include multiplexers or other equipment.

B. Example Fiber Distribution Hub

Figure 2:
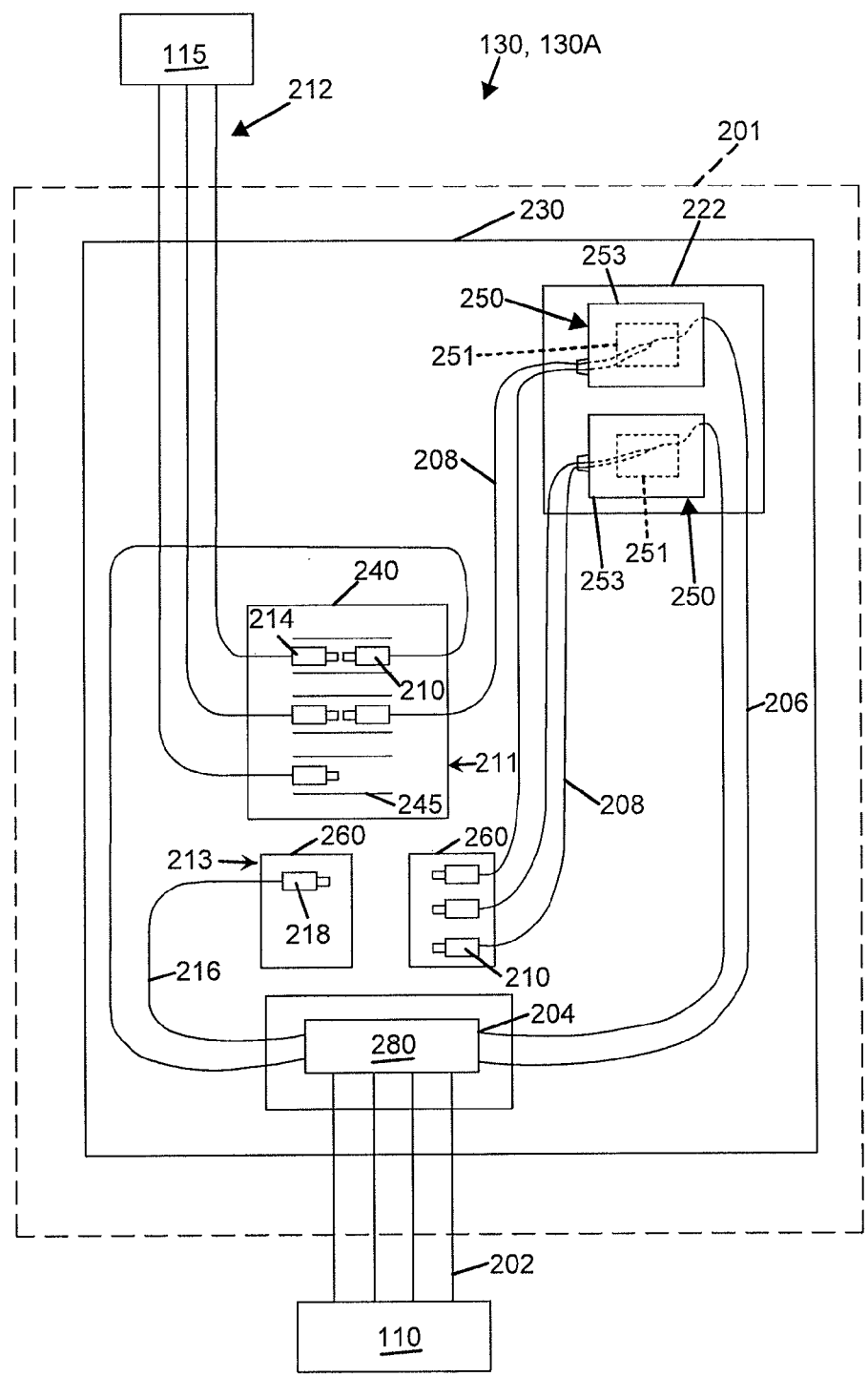
FIG. 2 is a schematic drawing of an example fiber distribution hub that can be used in the fiber optic network of FIG. 1.
Figure 3:
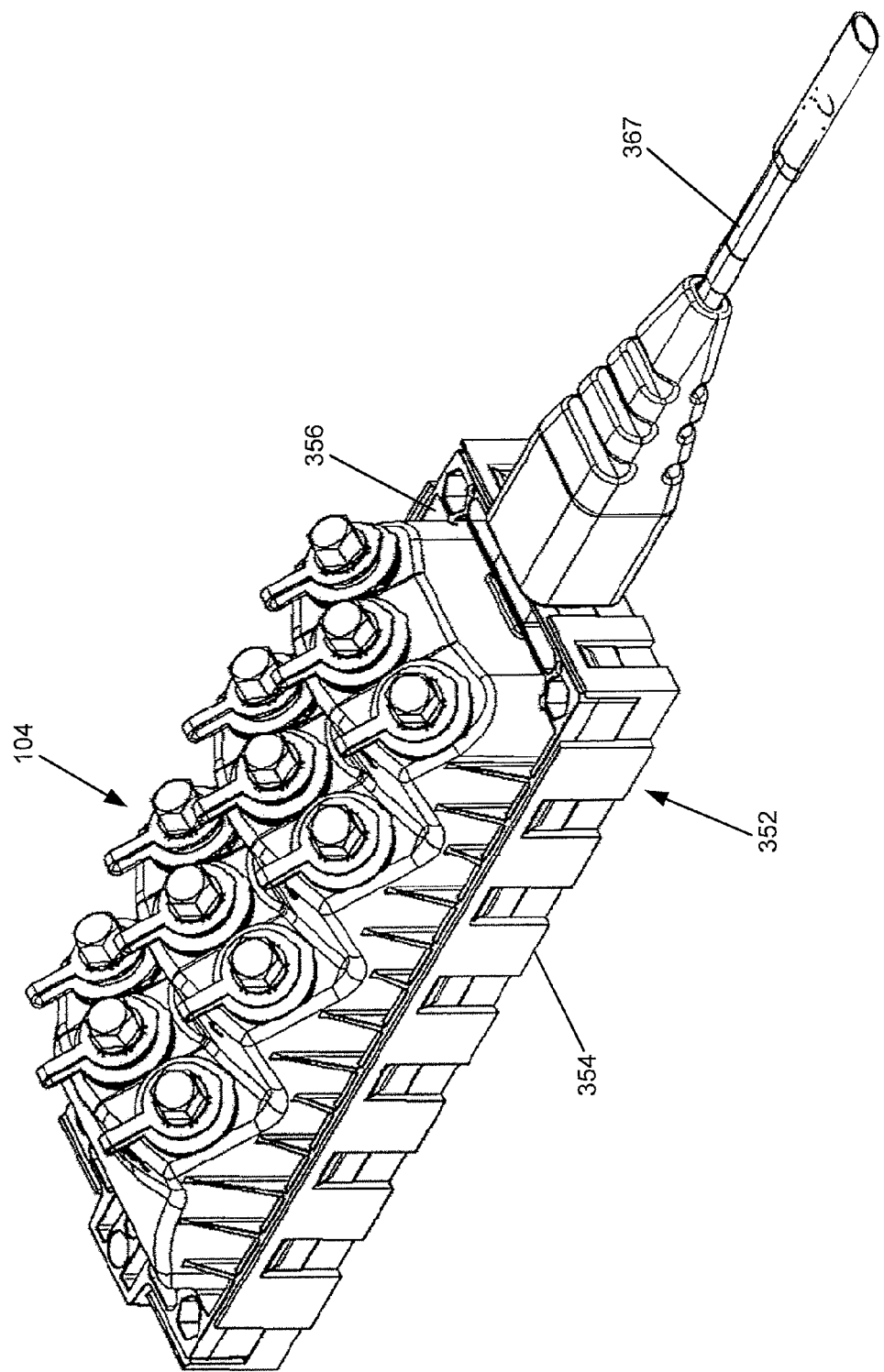
FIG. 3 is a front, bottom perspective view of a drop terminal that can be used in the fiber optic network of FIG. 1.
Figure 4:
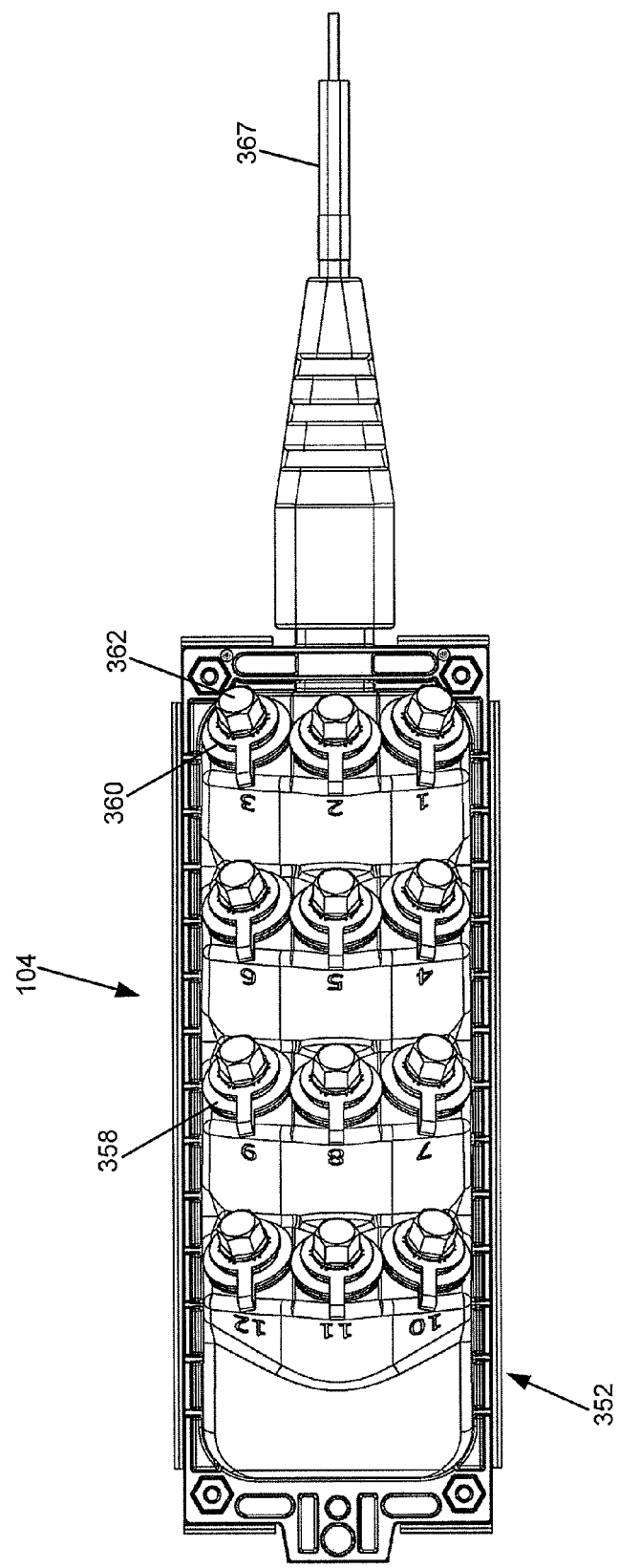
FIG. 4 is a front view of the drop terminal of FIG. 3.
Figure 5:
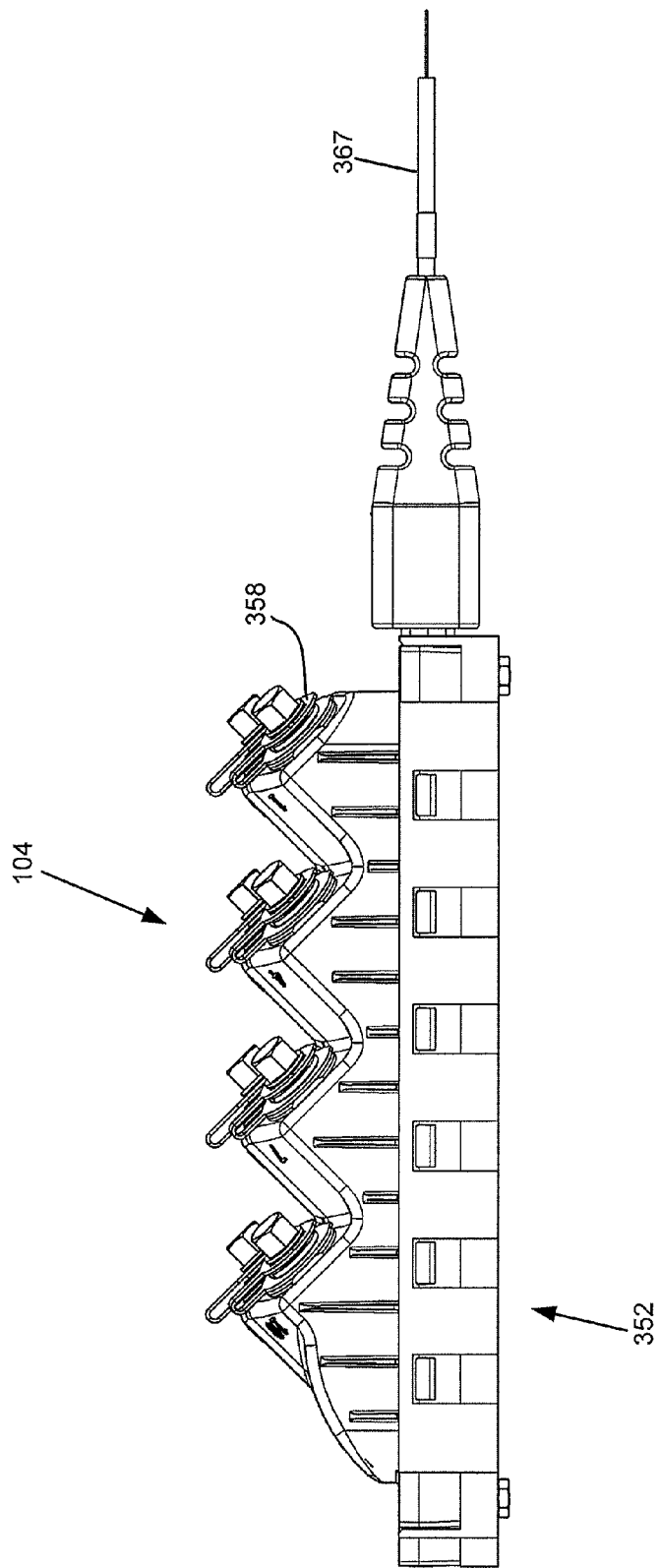
FIG. 5 is a side view of the drop terminal of FIG. 3.
Figure 6:
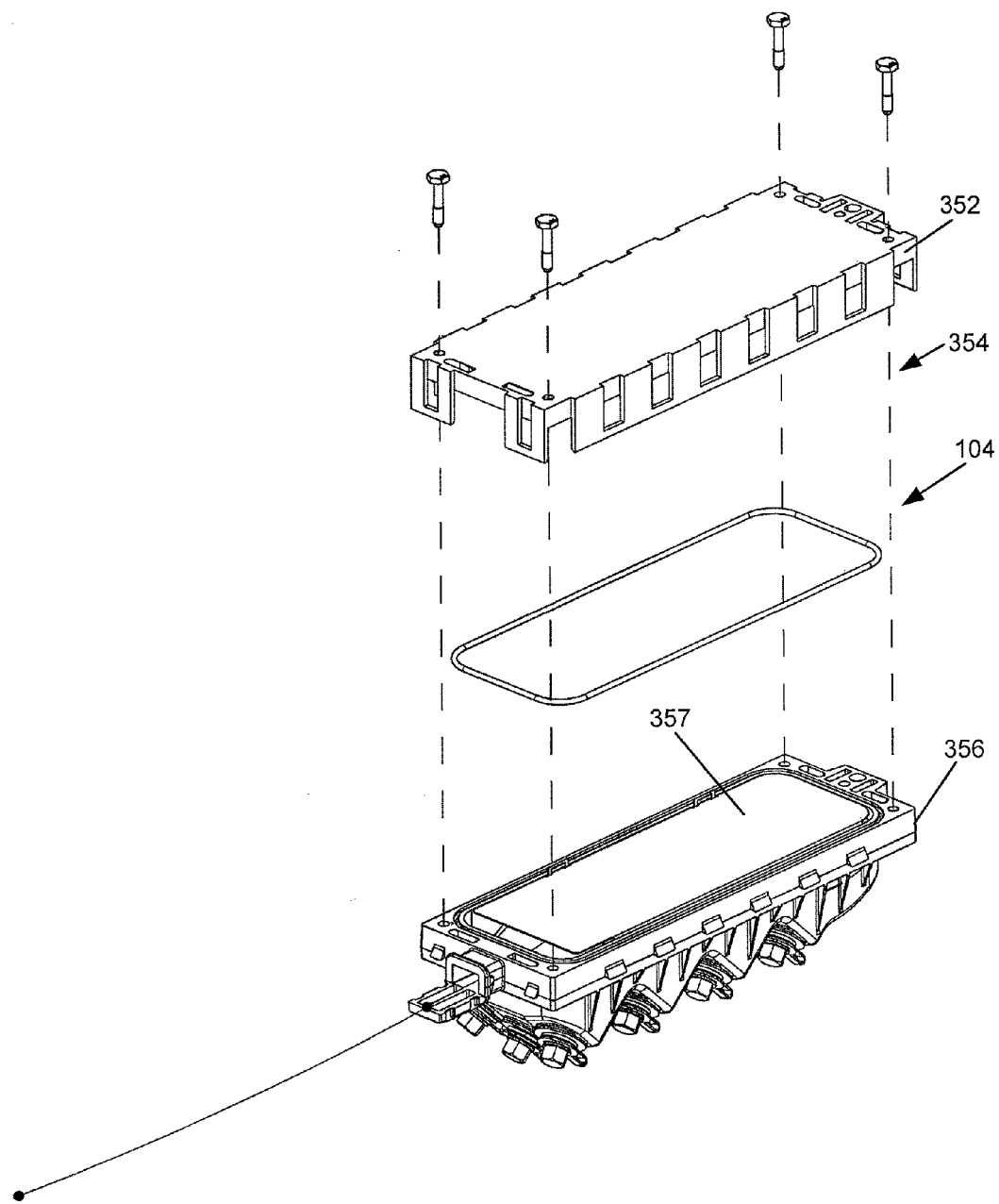
FIG. 6 is an exploded, perspective view of the drop terminal of FIG. 3.
Figure 7:
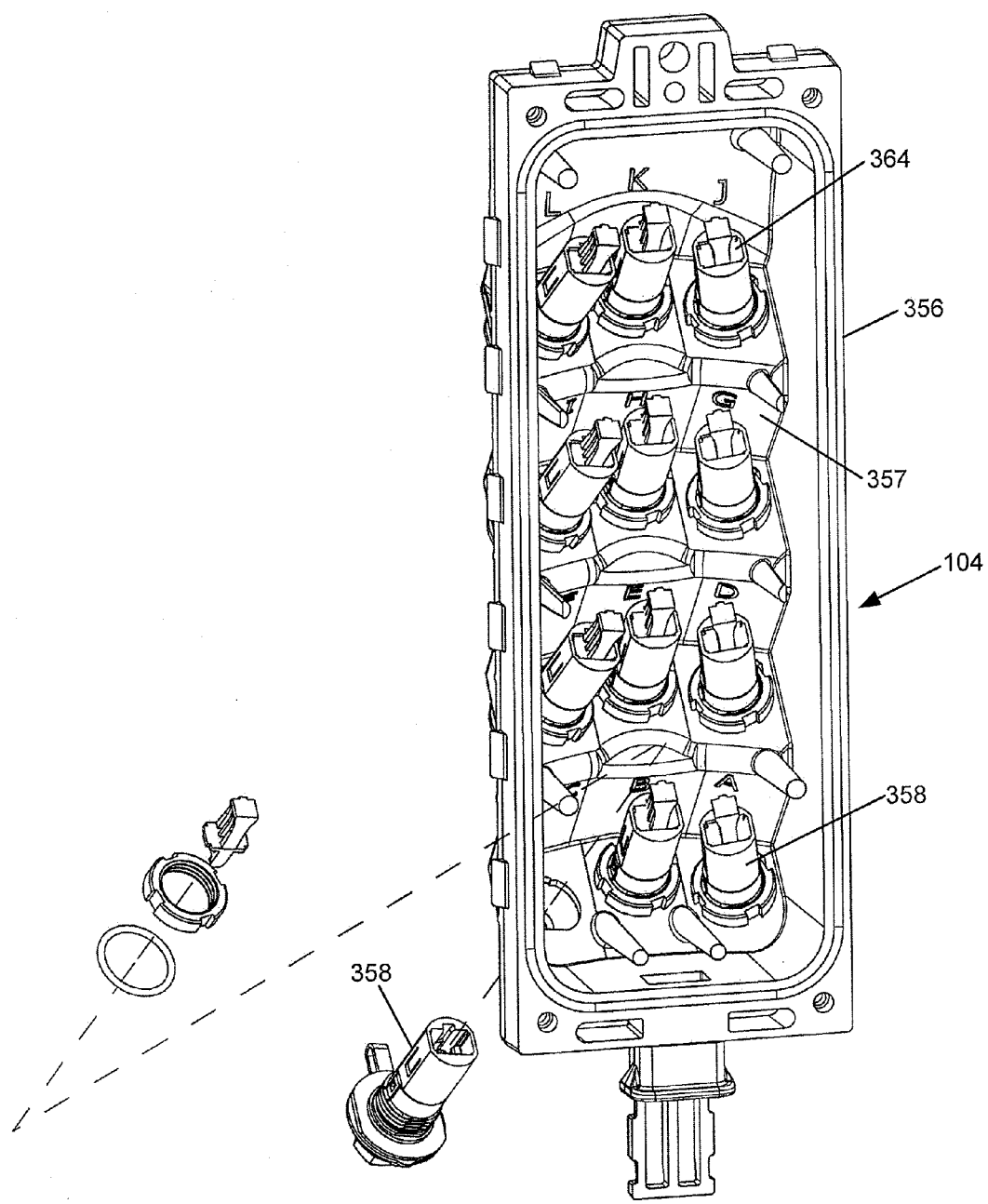
FIG. 7 is a view showing the interior of a front piece of the drop terminal of FIG. 3.
Figure 8:
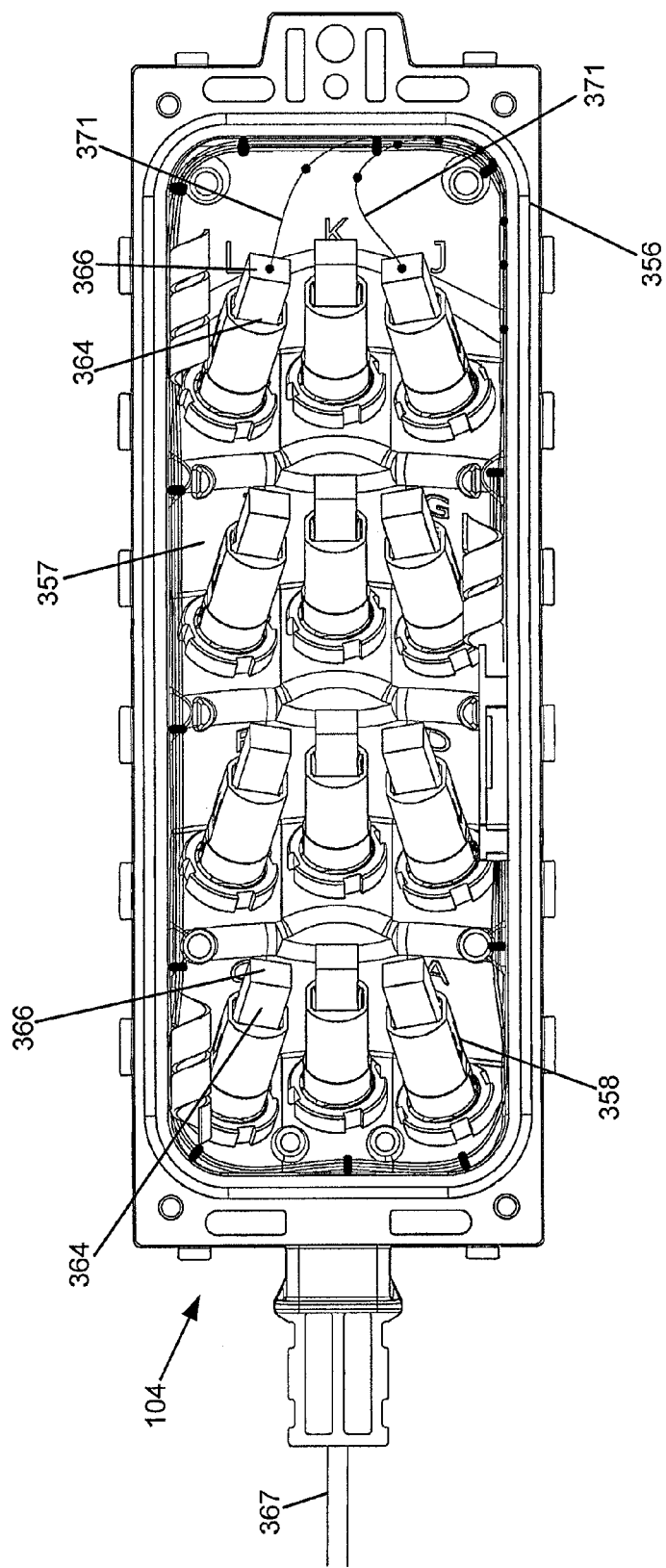
FIG. 8 is another view showing the interior of the front piece of the drop terminal of FIG. 3.

FIG. 2 is a schematic diagram showing an example lay out that can be used for the FDHs 130, 130A in the network of FIG. 1. Each FDH 130, 130A generally administers connections at a termination region 211 between incoming fibers and outgoing fibers in an Outside Plant (OSP) environment. As the term is used herein, "a connection" between fibers includes both direct and indirect connections. Examples of incoming fibers include fibers from a feeder cable 202 that enter the FDH 130, 130A and intermediate fibers (e.g., connectorized pigtails 208 extending from splitters 250 and patching fibers/jumpers) that connect the fibers of the feeder cable 202 to the termination region 211. Examples of outgoing fibers include fibers of a subscriber cable 212 (e.g., fibers of F2 distribution cables) that exit the FDH 130, 130A and any intermediate fibers that connect the fibers of the subscriber cable 212 fibers to the termination region 211. The FDH 130, 130A provides an interconnect interface for optical transmission signals at a location in the network where operational access and reconfiguration are desired. For example, the FDH 130, 130A can be used to split the signals from the feeder cables 202 and direct the split signals to the fiber of the distribution cables 212 routed to subscriber locations 115. In addition, the FDH 130, 130A is designed to accommodate a range of alternative sizes and fiber counts and support factory installation of pigtails 208, fanouts, and splitter modules 250.

As shown at FIG. 2, the feeder cable 202 is initially routed into the example FDH 130 through an enclosure/cabinet 201 (e.g., typically through the back or bottom of the cabinet 201). In certain embodiments, the fibers of the feeder cable 202 can include ribbon fibers. An example feeder cable 202 may include twelve to forty-eight individual fibers connected to the service provider's central office 110. In certain embodiments, after entering the cabinet 201, the fibers of the feeder cable 202 are routed to a feeder cable interface 280 (e.g., fiber optic adapter modules, a splice tray, etc.). At the feeder cable interface 280, one or more of the fibers of the feeder cable 202 are individually connected to ends 204 of separate splitter input fibers 206. The splitter input fibers 206 are routed from the feeder cable interface 280 to a splitter mounting location 222 at which a plurality of the splitter modules 250 can be mounted. In certain embodiments, the feeder cable interface 280 can be located at the splitter mounting location 222 such that the splitter modules plug directly into the feeder cable interface (e.g., see U.S. Pat. No. 7,418,181 that is hereby incorporated by reference). Each splitter module 250 includes at least one fiber optic splitter 251 positioned within a splitter housing 253. At the splitter mounting location 222, the splitter input fibers 206 are optically connected to separate splitter modules 250, wherein the input fibers 206 are each split by the fiber optic splitters 251 of the splitter modules 250 into multiple pigtails 208, each having a connectorized end 210. The termination region 211, the splitter mounting region 222a, storage region 213 and the feeder cable interface 280 can all be mounted on a swing frame/chassis 230 mounted within the cabinet 201. The chassis 230 is pivotally movable relative to the cabinet 201 between a stowed position in which the chassis 230 is fully within the cabinet 201 and an access position in which the chassis 230 projects at least partially outside the cabinet 201. The pivotal configuration of the chassis 230 allows the various components carried by the chassis 230 to be more easily accessed.

When the pigtails 208 are not in service, the connectorized ends 210 can be temporarily stored on a storage module 260 that is mounted at the storage region 213 of the swing frame 230. When the pigtails 208 are needed for service, the pigtails 208 are routed from the splitter modules 250 to a termination module 240 that is provided at the termination region 211 of the swing frame 230. At the termination module 240, the connectorized ends 210 of the pigtails 208 are connected to connectorized ends 214 of the fibers of the distribution cable 212 by fiber optic adapters 245. The termination region 211 is the dividing line between the incoming fibers and the outgoing fibers. A typical distribution cable 212 forms the F2 portion of a network (see FIG. 1) and typically includes a plurality of fibers (e.g., 144, 216 or 432 fibers) that are routed from the FDH 130, 130A to subscriber locations 115. Example FDHs are disclosed at U.S. patent application Ser. Nos. 11/544,951 and 12/241,576 that are hereby incorporated by reference.

The splitter modules 250 and storage modules 260 can be incrementally added to the swing frame 230. The connectorized pigtails 208 are typically stored in one or more of the storage modules 260 prior to installation on the swing frame 230. In certain embodiments, the connector 210 of each pigtail 208 is secured in one of the storage modules 260 before the splitter module 250 leaves the factory.

C. Example Drop Terminal

FIGS. 3-8 show an example configuration for the drop terminals 104 used in the network of FIG. 1. The drop terminal configuration includes a housing 352 having a back piece 354 and a front piece 356 that cooperate to enclose an interior region 357 (shown at FIG. 6 where the back piece 354 has been removed from the front piece 356). A plurality of fiber optic adapters 358 are mounted to the front piece 356. The adapters 358 include exterior ports 360 that are accessible from the outside of the housing 352. In use, connectorized ends of drop cables can be inserted into the exterior ports 360 to connect the drop cables to the network. The exterior ports 360 are enclosed by plugs 362 when not connected to drop cables. The fiber optic adapters 358 also include interior ports 364 that are accessible from inside the housing 352. The interior ports 364 receive interior fiber optic connectors 366 (e.g., standard SC connectors as disclosed at U.S. Pat. No. 5,317,663, which is hereby incorporated by reference) that are mounted to the ends of fibers 371 corresponding to a fiber optic cable 367 (e.g., a branch cable from an F2 trunk) that is routed into the interior of the housing 352. At FIG. 8, for clarity, the routing paths for only two of the fibers 371 are shown. In practice, fibers 371 will be routed to each of the interior fiber optic connectors 366 of the drop terminal 104. The fibers 371 are optically coupled to corresponding fibers of the cable 367. For example, the fibers 271 can be integral continuations of the fibers of the cable 367 or can be spliced to the fibers of the cable 367. Further details about the drop terminal configuration can be found in U.S. application Ser. No. 12/248,564, which is hereby incorporated by reference in its entirety.

Figure 9:
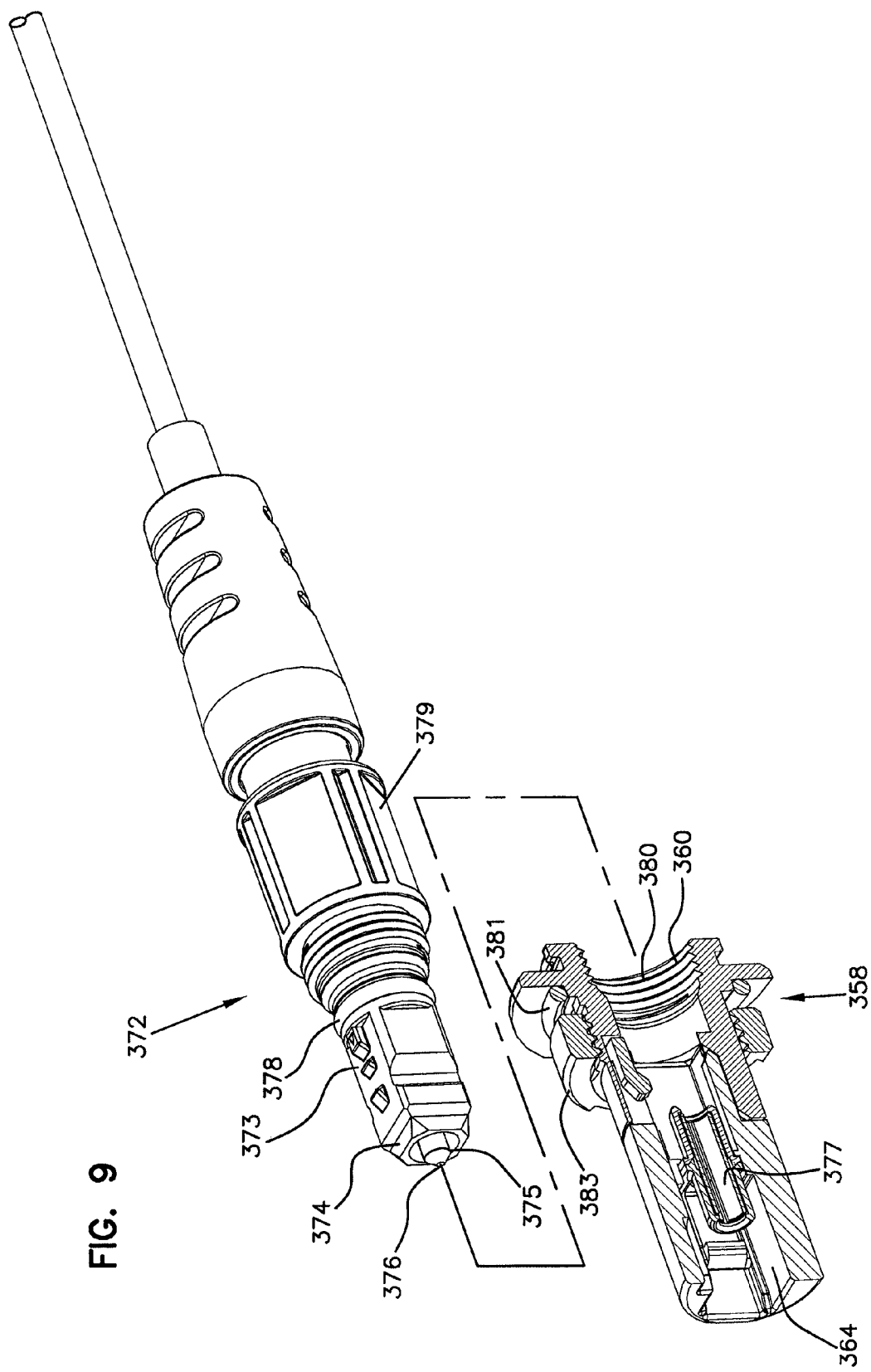
FIG. 9 is a perspective, partial cross-sectional view showing a fiber optic adapter and fiber optic connector that can be used with the drop terminal of FIG. 3.

FIG. 9 is a partial cross-sectional view showing one of the fiber optic adapters 358 and a corresponding exterior fiber optic connector 372 adapted to be received within the exterior port 360 of the adapter 358. The exterior fiber optic connector 372 includes a connector body 373 having a distal end portion 374 at which a ferrule 375 is mounted. The ferrule 375 supports and end portion of an optical fiber 376 of a cable (e.g., a drop cable) to which the fiber optic connector 372 is attached. When the connector 373 is inserted within the exterior port 360, the ferrule 375 fits within an alignment sleeve 377 (e.g., a split sleeve) of the adapter 358. The alignment sleeve 377 also receives a ferrule of the interior connector 366 inserted within the interior port 364 of the fiber optic adapter 358. In this way, the alignment sleeve 377 provides alignment between the fiber 376 of the exterior fiber optic connector 372 and the fiber 371 of the interior fiber optic connector 366 thereby providing an optical connection that allows optical signals can be transferred between the fibers 376, 371. In some implementations, the first connector and the adapter are hardened or ruggedized. By, hardened or ruggedized, it is meant that first connector and the adapter are adapted for outside environmental use. For example, the first connector and the adapter can include environmental seals for preventing moisture/water intrusion. Also, it is preferred for the first connector to be able to withstand a 100 pound axial pull-out force when coupled to the adapter. For example, an o-ring 378 is mounted about the connector body 373 and forms an environmental seal between the connector body 373 and the fiber optic adapter 358 when the exterior fiber optic connector 372 is mounted within the exterior port 360. The exterior fiber optic connector 372 can be retained within the exterior port 360 by a threaded fastener 379 that threads into internal threads 380 defined within the exterior port 360. The fiber optic adapter 358 also includes a sealing member 381 (e.g., a o-ring) that provides an environmental seal between the exterior of the fiber optic adapter 358 and the front piece 356 of the drop terminal 104 when the adapter 358 is mounted within an opening defined by the front piece 356. A nut 383 can be used to secure the adapter 358 to the front piece 356 of the drop terminal 104. Further details of the fiber optic adapter 358 and the exterior fiber optic connector 372 are disclosed at U.S. application Ser. No. 12/203,508, which is hereby incorporated by reference.

D. Example Cabling Configurations for Providing Power to a Wireless Transceiver

Figure 10:
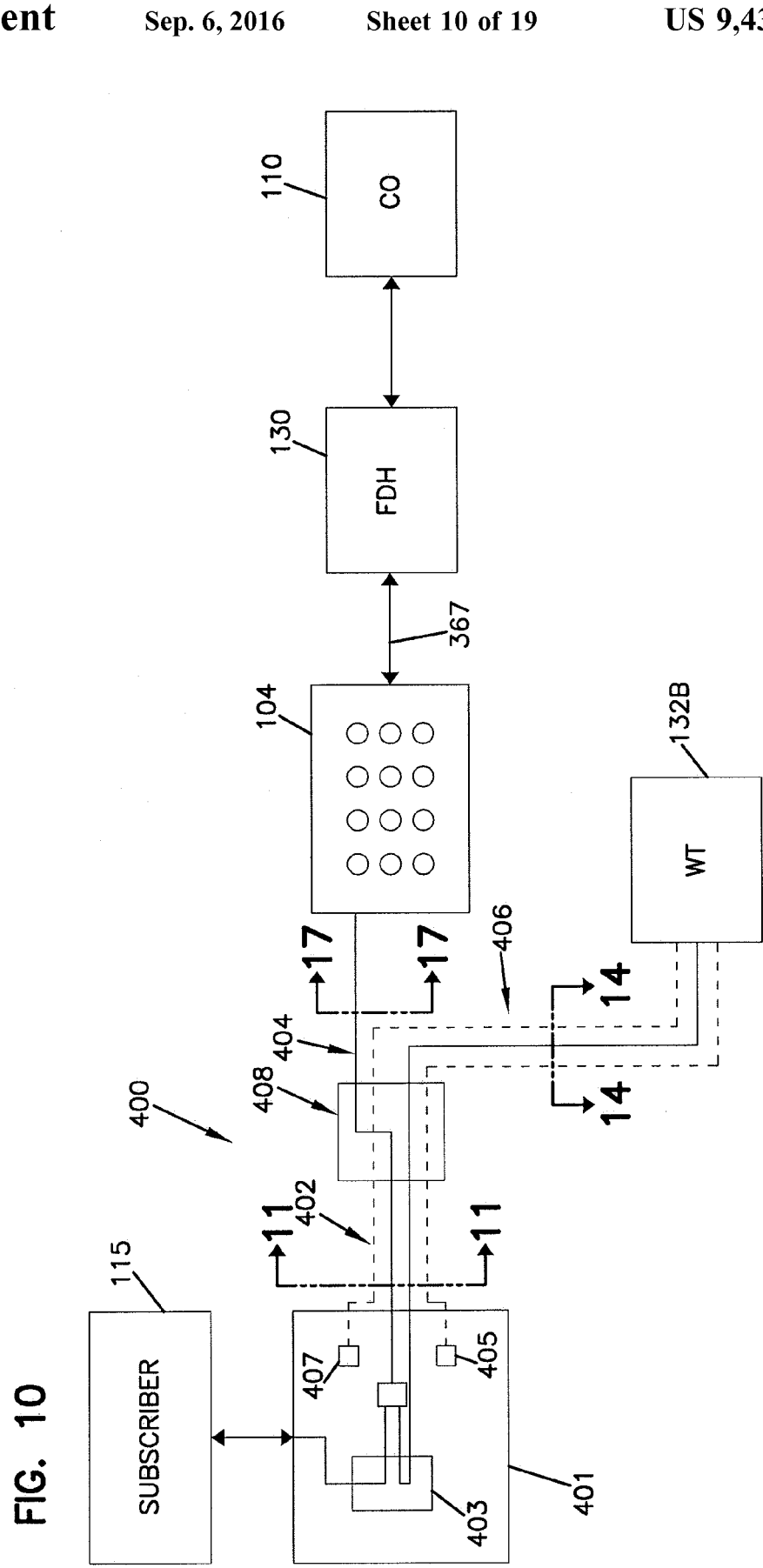
FIG. 10 is a schematic view of a first cable configuration between a drop terminal, a network interface device and a wireless transceiver.

FIG. 10 shows an example cabling configuration 400 used to provide power and network connections to one of the wireless transmitters 132B of the network of FIG. 1. Generally, the cabling configuration 400 provides an optical signal feed from one of the drop terminals 104 to an ONT 401 positioned at the subscriber location 115. As described previously, the drop terminal 104 can be optically connected to one of the FDHs 130A (e.g., by an F2 distribution cable such as cable 367) which is optically connected to the central office 110. The ONT 401 includes a converter 403 that converts fiber optic signals to Ethernet signals and that converts Ethernet signals back to fiber optic signals. The ONT 401 also typically includes other signal processing equipment (e.g., a multiplexer) in addition to the converter 403. In one embodiment, the optical signal feed is split before being converted at the converter 403. The split fiber optic signal feeds are converted to Ethernet signal feeds at the converter 403. One of the converted signal feeds is provided to the subscriber 115 while the other converted signal feed is back fed through the cabling configuration 400 to the wireless transceiver 132B. The cabling configuration 400 is also used to provide a power connection between a power source 405 at the ONT 401 and the wireless transceiver 132B. The cabling configuration 400 can also provide a ground connection between the wireless transceiver 132B and a ground location 407 at the ONT 401. In other embodiments, the Ethernet signal may be split. In still other embodiments, multiple fiber optic lines may be routed to the ONT 401 thereby eliminating the need for signal splitting.

The cabling configuration 400 includes a bifurcated cable having a trunk section 402 and two branch sections 404, 406. The branch sections 404, 406 are connected to the trunk section 402 at a furcation member 408. The trunk 402 is capable of transmitting twisted pair Ethernet signals and fiber optic signals. The trunk 402 also include power and ground lines. The branch section 404 is adapted for carrying fiber optic signals. The branch section 406 is adapted for carrying twisted pair Ethernet signals and also includes power and ground lines.

Figure 13:
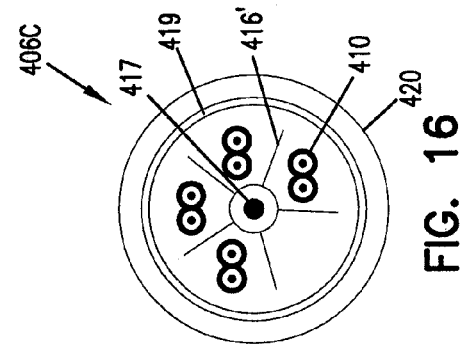
FIG. 13 is a cross-sectional view taken along section line 11-11 of FIG. 10 showing another trunk section that can be used with the cable configuration of FIG. 10.
Figure 12:
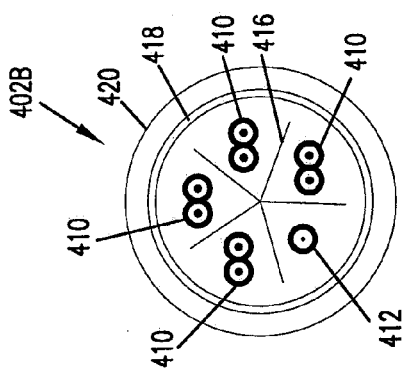
FIG. 12 is a cross-sectional view taken along section line 11-11 of FIG. 10 showing an alternative trunk section for the cable configuration of FIG. 10.
Figure 11:
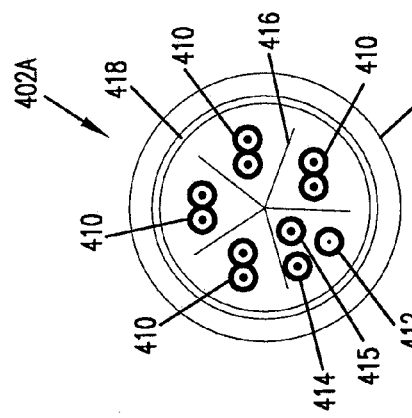
FIG. 11 is a cross-sectional view taken along section line 11-11 of FIG. 10 showing an example trunk section that can be used in the cable configuration of FIG. 10.

FIGS. 11-13 show several different cable arrangements that can be used for the trunk section 402 of the cabling configuration 400. The views of FIGS. 11-13 are taken along cross section line 11-11 of FIG. 10. Referring to FIG. 11, cable arrangement 402A includes four twisted wire pairs 410. Each twisted wire pair 410 includes two wires that are twisted relative to one another about a common axis. Each of the wires includes a central conductor (e.g., a copper conductor) and an insulation layer surrounding the central conductor. In other embodiments, co-axial cable could be used in place of the twisted pair wires. Referring still to FIG. 11, the cable configuration 402A also includes an optical fiber 412, a dedicated power line 414 and a dedicated ground line 415. In one embodiment, the optical fiber can include a bend sensitive optical fiber having an outer diameter of about 250 microns. The optical fiber can be loosely or tightly buffered. In one embodiment, a tight buffer layer having an outer diameter of about 900 microns is provided over the optical fiber.

The power line 414 and ground line 415 are used to transfer power between the power source 405 and active components of the wireless transceiver 132B. The twisted wire pairs 410 are used to convey Ethernet signals between the ONT 401 and the wireless transmitter 132B. The optical fiber 412 is used to convey fiber optic signals between the drop terminal 104 and the ONT 401.

Referring still to FIG. 11, the cable arrangement 402A also includes a spacer 416 for separating the various wires/fibers of the cable arrangement. The spacer and the wires/fibers together form a core of the cable arrangement 402A. A strength layer 418 is positioned around the core. In one embodiment, the strength layer 418 includes tensile reinforcing members such as aramid yarn. The cable arrangement 402A also includes an outer jacket 420 that surrounds the strength layer 418.

The spacer 416 functions to position and maintain separation between the components forming the core of the cable configurations. For example, the depicted spacer 416 defines a plurality separate pockets for receiving components such as twisted wire pairs, fibers and power/ground lines. In other embodiments, cables in accordance with the principles of the present disclosure may include tape spacers (e.g., tape dividers/separators). In further embodiments, cable arrangements in accordance with the principles of the present disclosure may not use spacers.

The cable arrangement 402B of FIG. 12 is the same as the cable arrangement 402A of FIG. 11 except no dedicated power or ground lines are provided within the cable arrangement 402B. Instead, power is carried through the cable arrangement 402B along selected ones of the twisted wire pairs 410.

Similar to the cable arrangement 402B of FIG. 12, the cable arrangement 402C of FIG. 13 also includes four twisted wire pairs 410 and optical fiber 412. However, the cable arrangement 402C has a modified spacer 416' within which a central strength member 417 is located. The central strength member 417 preferably provides tensile reinforcement to the cable arrangement 402C. Also, it is preferred for the central strength member 417 to be made of an electrically conductive material. In one embodiment, the central strength member 417 is made of a metal material such as steel. The cable arrangement 402C also includes a conductive layer 419 that surrounds the inner cable core. The conductive layer 419 can include a braid of material such as aramid yarn and metal strands (e.g., copper strands). In other embodiments, the conductive layer 419 can be formed by a layer of conductive tape. In one embodiment, the central strength member 417 can be used as a power line for providing power to the wireless transceiver 132B and the conductive layer 419 can be used as a ground line. The outer jacket 420 surrounds the conductive layer 419.

Figure 16:
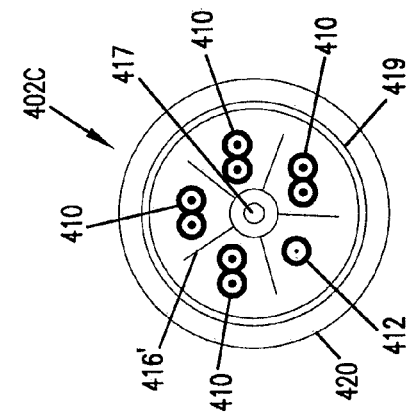
FIG. 16 is a cross-sectional view taken along section line 14-14 of FIG. 10 showing still another branch section that can be used with the cable configuration of FIG. 10.
Figure 15:
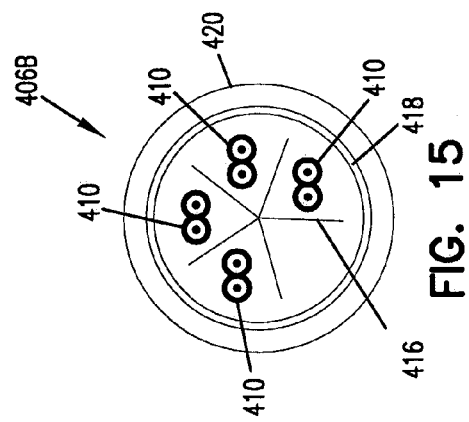
FIG. 15 is a cross-sectional view taken along section line 14-14 of FIG. 10 showing an alternative branch section for the cable configuration of FIG. 10.
Figure 14:
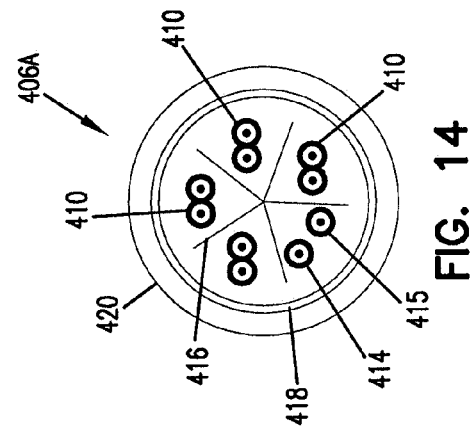
FIG. 14 is a cross-sectional view taken along section line 14-14 of FIG. 10 showing an example branch section for the cable configuration of FIG. 10.

Example cable arrangements 406A-406C for the branch section 406 are shown at FIGS. 14-16. The views of FIGS. 14-16 are taken along section line 14-14 of FIG. 10. The cable arrangement 406A is the same as the cable arrangement 402A of FIG. 11 except the optical fiber 412 is not present. Similarly, the cable arrangement 406B of FIG. 15 is the same as the cable arrangement 402B of FIG. 12 except the optical fiber 412 is not present. Further, the cable arrangement 406C of FIG. 16 is the same as the cable arrangement 402C of FIG. 13 except the optical fiber 412 is not present. The optical fiber 412 is not present in the cable arrangements 406A-406C of FIGS. 14-16 because the optical fiber 412 is broken out from the trunk section 402 and routed into the branch section 404 at the furcation member 408. Other than the fiber 412, the remainder of the trunk section 402 extends through the furcation member 408 to form the branch section 406. The branch section 404 preferably has an arrangement suitable for protecting the optical fiber 412. The optical fiber 412 can have a connectorized end (e.g., a connector such as the connector 372 of FIG. 9) that can be readily inserted into one of the exterior ports 360 of the drop terminal 104. By inserting the connectorized end into the exterior port 360, an optical connection is made between the optical fiber 412 and one of the optical fibers 371 (shown at FIG. 8) of the fiber optic cable 367 routed to the drop terminal 104.

FIGS. 17 and 18 show example cable arrangements 404A, 404B suitable for use as the branch section 404 of the cable configuration 400 of FIG. 10. In the cable arrangement 404A of FIG. 17, the optical fiber 412 is surrounded by a buffer layer (e.g., a tight buffer layer or a loose buffer tube) which in turn is surrounded by a strength layer 430. In one embodiment, the strength layer 430 provides tensile reinforcement to the cable arrangement 404A and can include a plurality of flexible reinforcing members such as aramid yarns. The strength layer 430 is surrounded by an outer jacket 440. The strength layer 430 can be anchored at one end of the branch section 404 to a connectorized end of the optical fiber 412 and can be anchored at the other end of the branch section 404 to the furcation member 408.

In the cable arrangement 404B of FIG. 18, the optical fiber 412 and buffer layer 413 are surrounded by an outer jacket 450 having a transverse cross section that is elongated along an axis 452. The optical fiber 412 is centered generally on the axis 452. Also, strength members 454 are positioned on the axis 452 on opposite sides of the optical fiber 412. The strength members 454 are embedded within the jacket 450 and are parallel to the optical fiber 412. The strength members 454 preferably provide tensile reinforcement to the cable arrangement 404B. In one embodiment, each of the strength members includes a rod formed by fiber glass reinforced epoxy. Similar to the strength layer 430 of the cable arrangement 404A of FIG. 12, the strength members 454 can be anchored at one end of the branch section 404 to the furcation member 408 and at the other end of the branch section 404 can be anchored to the connectorized end of the optical fiber 412.

Figure 19:
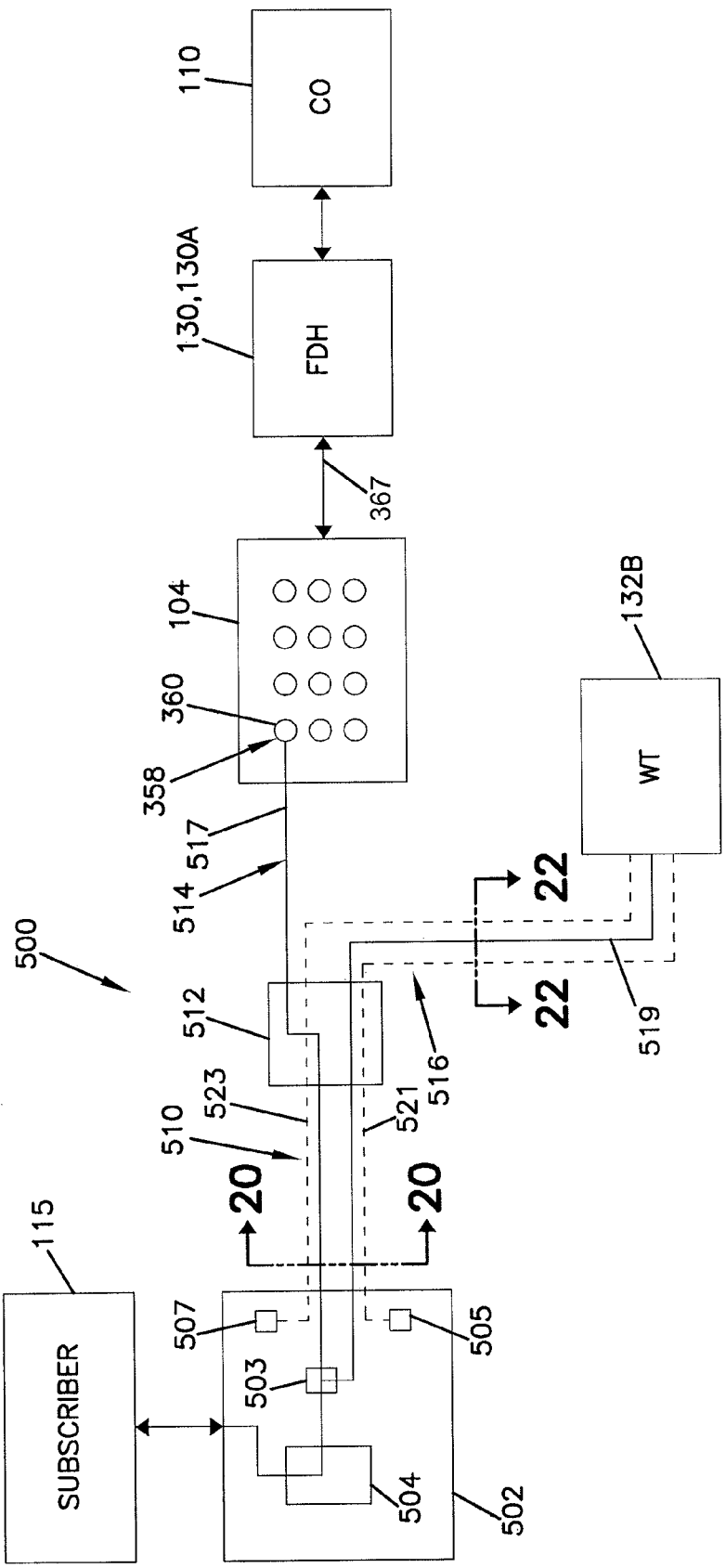
FIG. 19 shows a second cable configuration for providing an interconnection between a drop terminal, a network interface device and a wireless transceiver.

FIG. 19 depicts another cabling configuration 500 for back feeding telecommunications service and power from an ONT 502 to one of the wireless transceivers 132B of the network of FIG. 1. As shown at FIG. 19, distribution cable 367 is routed from FDH 130, 130A to one of the drop terminals 104. An optical signal provided to drop terminal 104 by the distribution cable 367 is directed from an exterior port 360 of one of the fiber optic adapters 358 of the drop terminal 104 through the cabling configuration 500 to the ONT 502. At the ONT 502, the optical signal is split at splitter 503. One output from the splitter 503 is directed to one or more components 504 of the ONT (e.g., an active component such as a converter and other equipment such as a multiplexer) and is then routed to the subscriber 115. The other output from the splitter 503 is back fed through the cabling configuration 500 to the wireless transceiver 132B. The cabling configuration 500 also electrically connects the wireless transceiver 132B to a power source 505 and a ground location 507 of the ONT 502.

The cabling configuration 500 includes a trunk section 510, a furcation member 512 and two branch sections 514, 516. The cabling configuration 500 includes a first optical transmission path 517 that extends from the drop terminal 104 through the branch section 514, the furcation member 512 and the trunk section 510 to the ONT 502. The cabling configuration 500 also includes a second optical transmission path 519 that extends from the wireless transceiver 132B through branch section 516, furcation member 512 and trunk section 510 to the ONT 502. The cabling configuration 500 further includes a power line 521 and a grounding line 523 that extend from the ONT 502 through the trunk section 510, the furcation member 512 and the branch section 516 to the wireless transceiver 132B.

Figure 20:
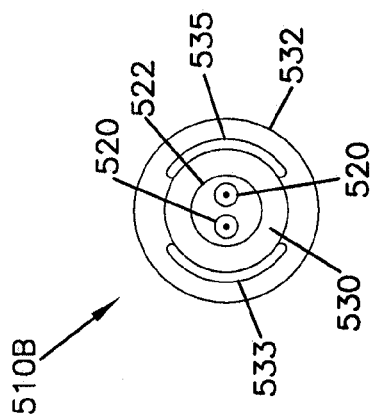
FIG. 20 is a cross-sectional view taken along section line 20-20 of FIG. 19 showing an example cable arrangement for a trunk section of the cable configuration of FIG. 15.
Figure 21:
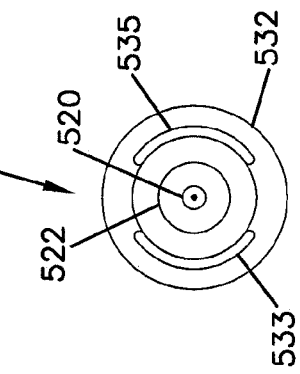
FIG. 21 is a cross-sectional view taken along section line 20-20 of FIG. 19 showing an alternative trunk section for the cable configuration of FIG. 19.

FIGS. 20 and 21 show example cable arrangements 510A, 510B (i.e., cable assemblies) that can be used for the trunk section 510 of the cabling configuration 500. The views of the FIGS. 20 and 21 are taken along cross section line 20-20 of FIG. 19. The cable arrangement 510A includes optical fibers 520 positioned within a buffer tube 522. The buffer tube 522 is encased within an outer jacket 524. When viewed in transverse cross section, the outer jacket 524 is elongated along an axis 526. The buffer tube 522 is centered on the axis 526. The cable arrangement 510A also includes two strength members 528 aligned along the axis 526 on opposite sides of the buffer tube 522. The strength members 528 preferably provide tensile reinforcement to the cable arrangement 510A and are preferably generally parallel to the buffer tube 522. In a preferred embodiment, at least portions of the strength members 528 are electrically conductive. For example, in one embodiment, the strength members 528 have a metal construction such as steel. In another embodiment, the strength members 528 can include a steel construction with an outer conductive coating such as copper. In still other embodiments, the strength members 528 can include fiber glass reinforced epoxy rods that are coated with a conductive layer such as copper.

The cable arrangement 510B of FIG. 21 includes buffer tube 522 surrounding optical fibers 520. The cable configuration 510 also includes a strength layer 530 that surrounds the buffer tube 522 and provides tensile reinforcement to the cable arrangement 510B. In a preferred embodiment, the strength layer is formed by a plurality of aramid yarns. An outer jacket 532 surrounds the strength layer 530. Conductive members 533, 535 (e.g., conductive tape or other conductive members) are positioned inside the jacket 532.

Figure 22:
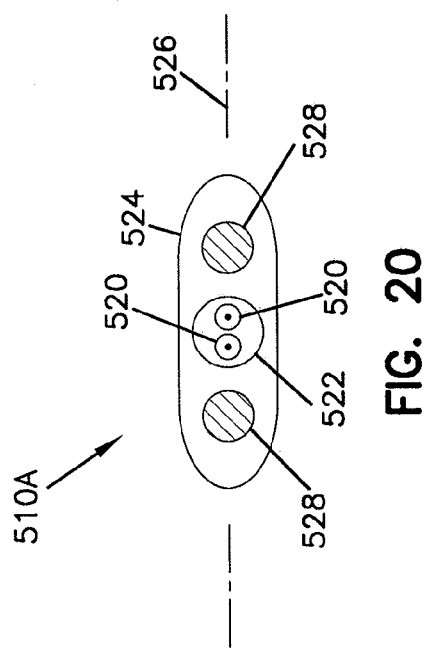
FIG. 22 is a cross-sectional view taken along section line 22-22 of FIG. 19 showing an example branch cable arrangement for the cable configuration of FIG. 19.
Figure 23:
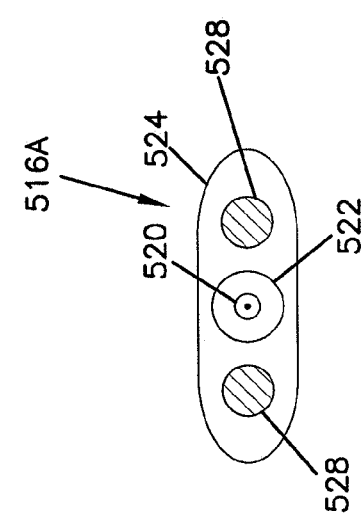
FIG. 23 is a cross-sectional view taken along section line 19-19 showing an alternative branch cable configuration that can be used for the cable configuration of FIG. 19.

FIGS. 22 and 23 show example cable arrangements 516A, 516B that can be used for the branch section 516 of the cabling configuration 500. The cable arrangement 516A of FIG. 22 is the same as the cable arrangement of 510A of FIG. 20 except one of the fibers 520 is not present. Similarly, the cable arrangement 516B of FIG. 23 is the same as the cable arrangement 510B of FIG. 121 except one of the fibers 520 is not present. By way of example, the branch section 514 can have a cable arrangement suitable for protecting an optical fiber such as the cable arrangements of FIGS. 17 and 18.

Generally, the cable arrangement forming the trunk section 510 extends from the ONT 502 through the furcation member 512 and then along the branch section 516. At the furcation 512, one of the fibers 522 is broken out from the trunk section 510 and directed along branch section 514. Thus, one of the fibers 520 of the cabling configuration 500 extends from the ONT 502 along the trunk section 510, through the furcation 512, along the branch section 516 to the wireless transmitter 132A to provide the second optical path 519. The other optical fiber 520 extends from the ONT 502 along the trunk section 510, through the furcation member 512, along the branch 514 to the drop terminal 104 to form the first optical path 517. The branch 514 can be terminated by a connector (e.g., a connector such as the connector 372 of FIG. 9) that is inserted in the exterior port 360 of one of the fiber optic adapters 358 of the drop terminal 104 to provide an optical connection with the FDH and the central office 110. The reinforcing members 528 extend from the ONT 502 along the trunk section 510 through the furcation member 512, along the branch section 516 to the wireless transceiver 132A to form the power and grounding lines 521, 523 between the wireless transceiver 132A and the power source 505 and grounding location 507 at the ONT 502. Because the strength members 528 have electrically conductive properties, the strength members 528 can serve the dual function of reinforcing the cable assembly 500 and also providing a power connection between the ONT 502 and the wireless transceiver.

Figure 24:
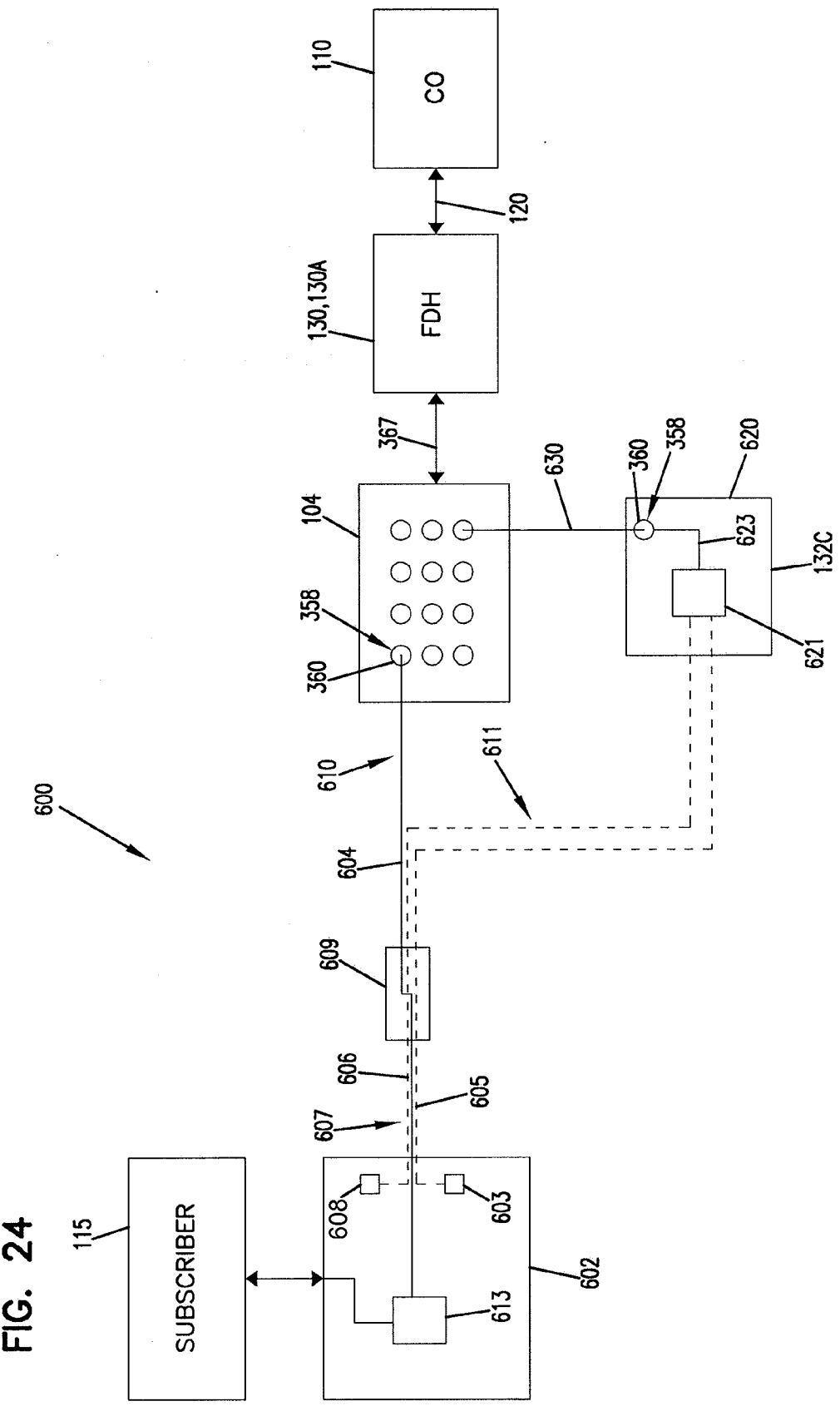
FIG. 24 is a third cable configuration for providing connections between a drop terminal, a network interface device and a wireless transceiver.

FIG. 24 shows a cabling configuration 600 for feeding power from an ONT 602 to a wireless transceiver 132C. The cabling configuration 600 includes an optical transmission path 604 that extends from the exterior ports 360 of one of the fiber optic adapters 358 of drop terminal 104 to the ONT 602. The cabling configuration 600 also includes a power line 605 and a grounding line 606 that extend from the ONT 602 to the wireless transceiver 132C. The optical transmission path 604 and the power and grounding lines 605, 606 are grouped together along a trunk section 607 of the cabling configuration 600. The optical transmission path 604 separates from the power and grounding lines 605, 606 at furcation member 609 such that the optical transmission path 604 extends along a first branch section 610 of the cabling configuration 600 and the power and grounding lines 605, 606 extend along a second branch section 611 of the cabling configuration 600. The optical transmission path 604 allows fiber optic telecommunications service to be provided to the subscriber 115 through the ONT 602. The branch section 610 can include a connectorized end (e.g., provided by a connector such as the connector 372 of FIG. 9) that is inserted in the exterior port 360 of one of the fiber optic adapters 358 of the drop terminal 104. As described previously, various active and passive components 613 can be provided within the ONT 602 for converting the optical signal to an Ethernet signal, and for providing multiplexing capabilities. The power line 605 is connected to a power source 603 located at the ONT 602 and the grounding line 606 is connected to a ground location 605 at the ONT 602.

Referring still to FIG. 24, the wireless transceiver 132C includes an outer housing 620 in which active transceiver components 621 of the transceiver are housed. At least one of the fiber optic adapters 358 is mounted to the outer housing 620. The exterior port 360 of the fiber optic adapter 358 is accessible from outside the housing 620 while the interior port 364 can receive the connectorized end of an optical fiber 623 routed from the fiber optic adapter 358 to the active transceiver component or components 621 within the housing 620 (e.g., transceiving equipment). A cable 630 is used to provide an optical transmission path between the drop terminal 104 and the wireless transceiver 132C. The cable 630 can include an optical fiber having connectorized ends inserted respectively in one of the exterior ports 360 of the drop terminal 104 and in the exterior port 360 of the wireless transceiver 132C. The connectorized ends of the cable can include connectors such as the connector 372 of FIG. 9. In this way, the wireless transceiver component 621 is placed in optical communication with the central office 110 via an optical transmission path that extends through fiber 623 to the cable 630, through the cable 630 to the drop terminal 104, through internal fibers 371 of the drop terminal to cable 367, through cable 367 to FDH 130, 130A, and through F2 cable 120 from FDH 130, 130A to the central office 110.

Figure 25:
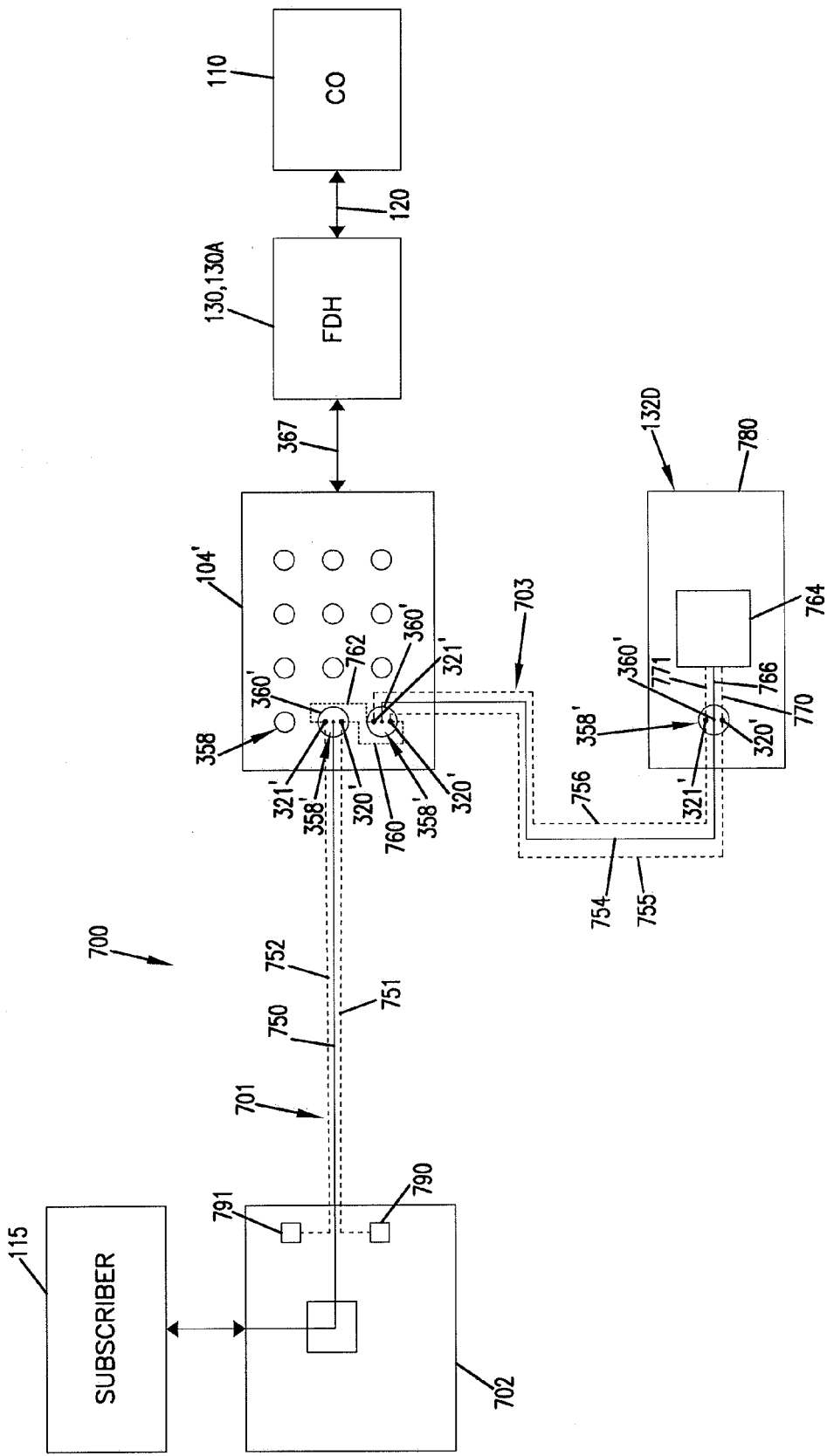
FIG. 25 is a schematic view showing a fourth cable configuration for providing connections between a drop terminal, a network interface device and a wireless transceiver.

FIG. 25 shows a cabling configuration 700 including a first cable 701 and a second cable 703. The first cable 701 provides an optical transmission path 750, a power line 751 and a grounding line 752 between an ONT 702 and a drop terminal 104'. The power and grounding lines 751, 752 are respectively connected to a power source 790 and a ground location 791 at the ONT 702. The second cable 703 provides an optical transmission path 754, a power line 755 and a grounding line 756 between the drop terminal 104' and a wireless transceiver 132D. The drop terminal 104' includes a plurality of the fiber optic adapters 258 mounted to an outer housing of the drop terminal 104'. The drop terminal 104' also includes a plurality of modified fiber optic adapters 258' (shown at FIG. 26) having interior ports 364' and exterior ports 360'. The fiber optic adapters 358' have the same configuration as the fiber optic adapter 358 shown at FIG. 9 except exterior ports 360' of the adapters 358' have been modified to include power contacts 390' and ground contacts 391'. The interior ports 364' receive internal fiber optic connectors corresponding to fibers of distribution cable 367 routed from the FDH 130, 130A to the drop terminal 104'.

Figure 26:
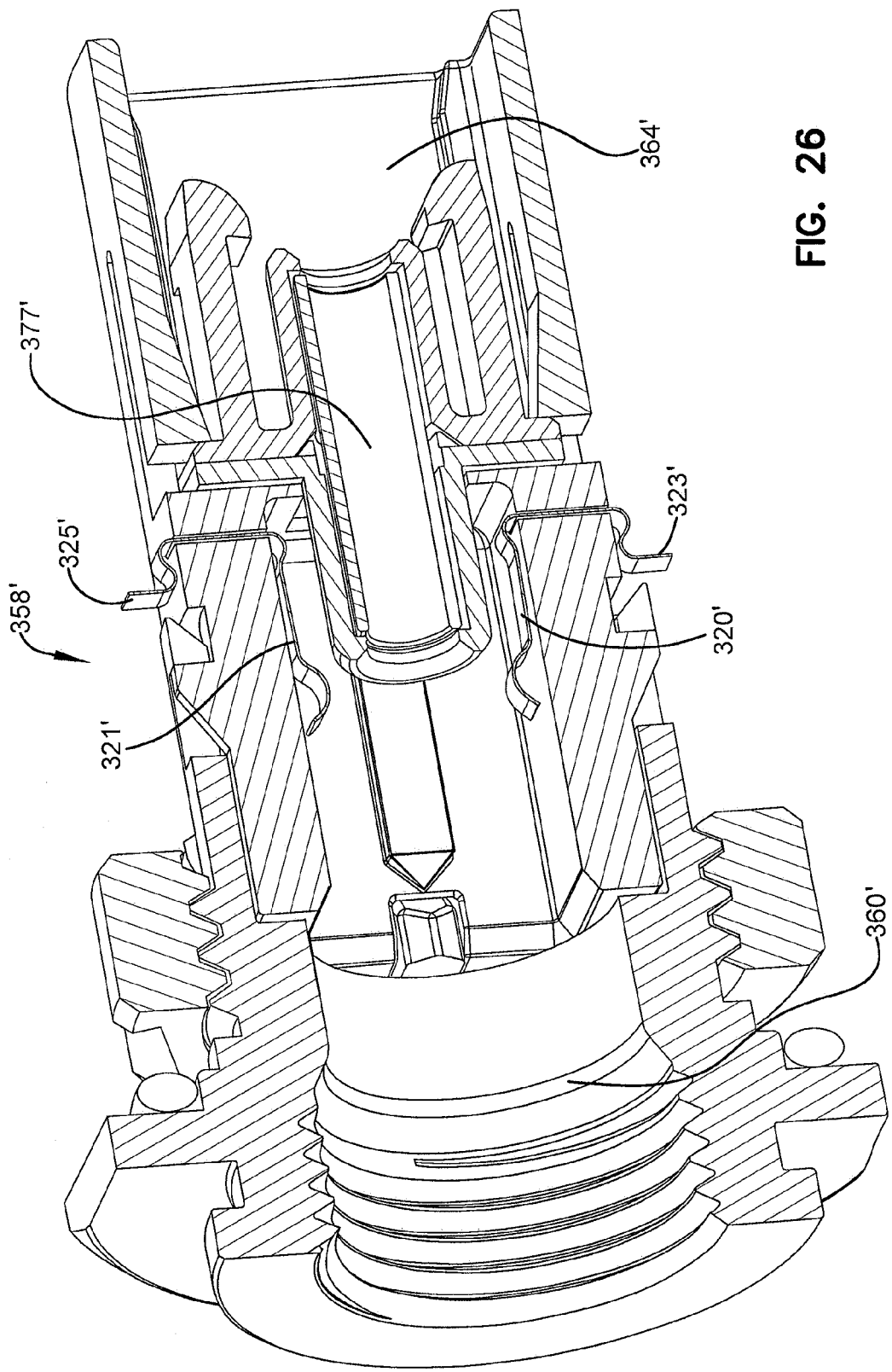
FIG. 26 is a cross-sectional view of an example fiber optic adapter that can be used on the drop terminal, the wireless transceiver and the network interface device of FIG. 25.

As shown at FIG. 26, the power contacts 320' and the ground contacts 321' are positioned at opposite sides of an alignment sleeve 377' of the fiber optic adapter 358'. As shown at FIG. 25, a first circuit path 760 is provided within the drop terminal 104' for electrically connecting the power contacts 320' of the fiber optic adapters 258'. The drop terminal 104' also includes a second circuit path 762 for electrically connecting the ground contacts 321' of the fiber optic adapters 258'. The contacts 320', 321' can respectively include exterior tabs 323', 325' for facilitating connecting the contacts 320', 321' to their respective circuit paths 760, 762. In one embodiment, the first and second circuit paths 760, 762 can be provided on a circuit board mounted within the drop terminal 104'.

Figure 27:
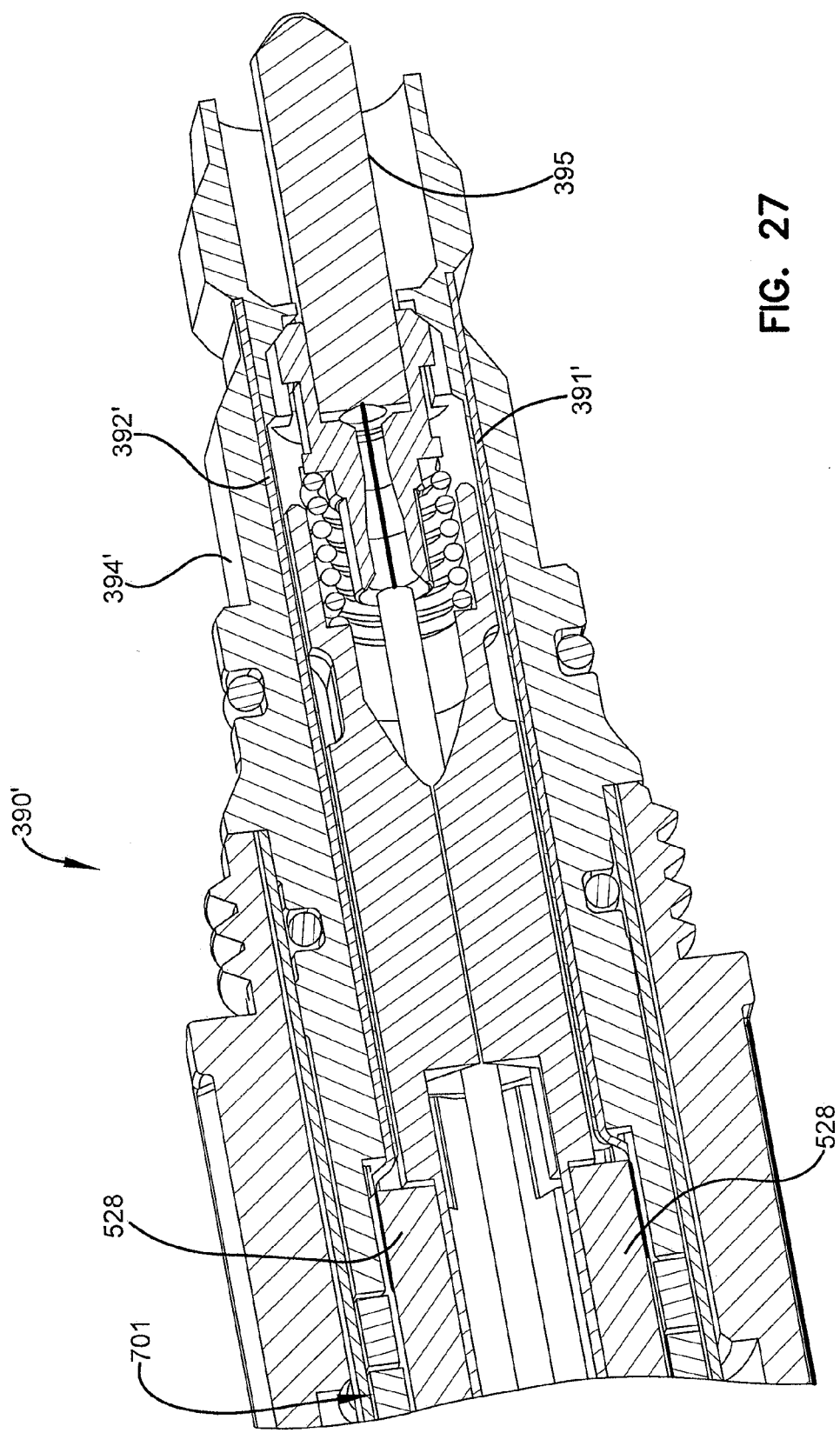
FIG. 27 is a cross-sectional view showing a ruggedized fiber optic connector that can be inserted in an exterior port of the fiber optic adapter of FIG. 26.

Referring to FIG. 27, an example connector 390' adapted to interface with the exterior ports 360' of the fiber optic adapters 358' is depicted. The connector 390' has substantially the same configuration as the connector 372 with the addition of a power lead 391' and a ground lead 392'. The connector 390' includes a connector body 394' supporting a ferrule 395'. The power and ground leads 391', 392' are positioned on opposite sides of the ferrule 395'. The connector 390' is shown connected to the end of the first cable 701. The first cable is shown having the same configuration as the cable 516A of FIG. 22. The power lead 391' is electrically connected to one of the conductive strength members 528 of the cable 701 while the ground lead 392' is electrically connected to the other conductive strength member 528 of the cable 701. The conductive strength members 528 respectively electrically connect the power and ground leads 391', 392' to the power source 790 and grounding location 791 at the ONT 702.

When the connector 390' is inserted within one of the exterior ports 360', the ferrule 395' fits within the alignment sleeve 377', the power lead 391' engages the power contact 320' and the ground lead 392' engages the ground contact 321'. Thus, via the interface between the connector 390' and the adapter 358', the fiber within the cable 701 is optically connected to one of the optical fibers of the distribution cable 367 routed from the drop terminal 104' to the FDH 130, 130A. The interface between the connector 390' and the adapter 358' also provides an electrical connection between the power source 790 (which is electrically connected to the power lead 391') and the first circuit path 760. The first circuit path 760 provides power to the power contact 320' of the other adapter 358' of the drop terminal 104'. The interface between the connector 390' and the adapter 358' further provides an electrical connection between the ground location 791 (which is electrically connected to the ground lead 392') and the second circuit path 762. The second circuit path 762 grounds the ground contact 321' of the other adapters 358' of the drop terminal 104'. In other embodiments, more than two of the adapters 358' can be provided on the drop terminal 104' and linked to remote power and grounding locations.

The adapter 358' and connector 390' interface can also be used at other locations where it is desired to connect power/ground and a fiber optic line through the same connector arrangement. For example, the adapter 358' and the connector 390' can be used at the interface between the first cable 701 and the ONT 702 of FIG. 25. Also, the adapter 358' and the connector 390' can be used at the interface between the trunk section 607 and the ONT 602 of FIG. 24. Further, the adapter 358' and the connector 390' can be used at the interface between the wireless transceiver 132B and the branch section 516 of FIG. 19. Moreover, the adapter 358' and connector 390' can be modified to have a multi-fiber ferrule and alignment sleeve configuration and used at the interface between the trunk 510 and the ONT 502 of FIG. 19.

Referring again to FIG. 25, the wireless transceiver 132D includes at least one of the fiber optic adapters 358' mounted to an exterior wall of an outer enclosure/housing 780 of the wireless transceiver 132D. The power contact 320' and the ground contact 321' of the fiber optic adapter 358' are preferably electrically connected by circuit paths 770, 771 to active transceiver components 764 located within the housing 780 of the wireless transceiver 132D. An internal optical fiber 766 extends from the active transceiver components 764 to a fiber optic connector mounted within the interior port 364' of the fiber optic adapter 258'. The second cable 703 is used to provide an optical transmission path and a power transmission path between the drop terminal 104' and the wireless transceiver 132D. The second cable 703 can have the same configuration as the first cable 701 used to connect the drop terminal 104' to the ONT 702. For example, the cable 702 can have each end connectorized with one of the connectors 390' and can have a cable configuration of the type shown by the cable 516A of FIG. 22. The connectorized ends of the second cable 703 are preferably inserted within corresponding exterior ports 360' of the drop terminal 104' and the wireless transceiver 132D. When the second cable 703 is installed between the drop terminal 104' and the wireless transceiver 132D, the internal optical fiber 766 of the wireless transceiver 132D is optically connected to one of the fibers of the distribution cable 367 that extends from the drop terminal 104' to the FDH 130, 130A. Also, the active transceiver components 764 are electrically connected to the power source 790 and grounding location 791 of the ONT 702. Specifically, the grounding and power pathways extend through the first cable 701 from the ONT 702 to a first one of the adapters 358', through the circuit paths 760, 762 to a second one of the adapters 358', through the second cable 703 to the contacts 320', 321' of the adapter 358' on the wireless transceiver 132D, and then through the circuit paths 770, 771 to the active transceiver components 764.

Figure 28:
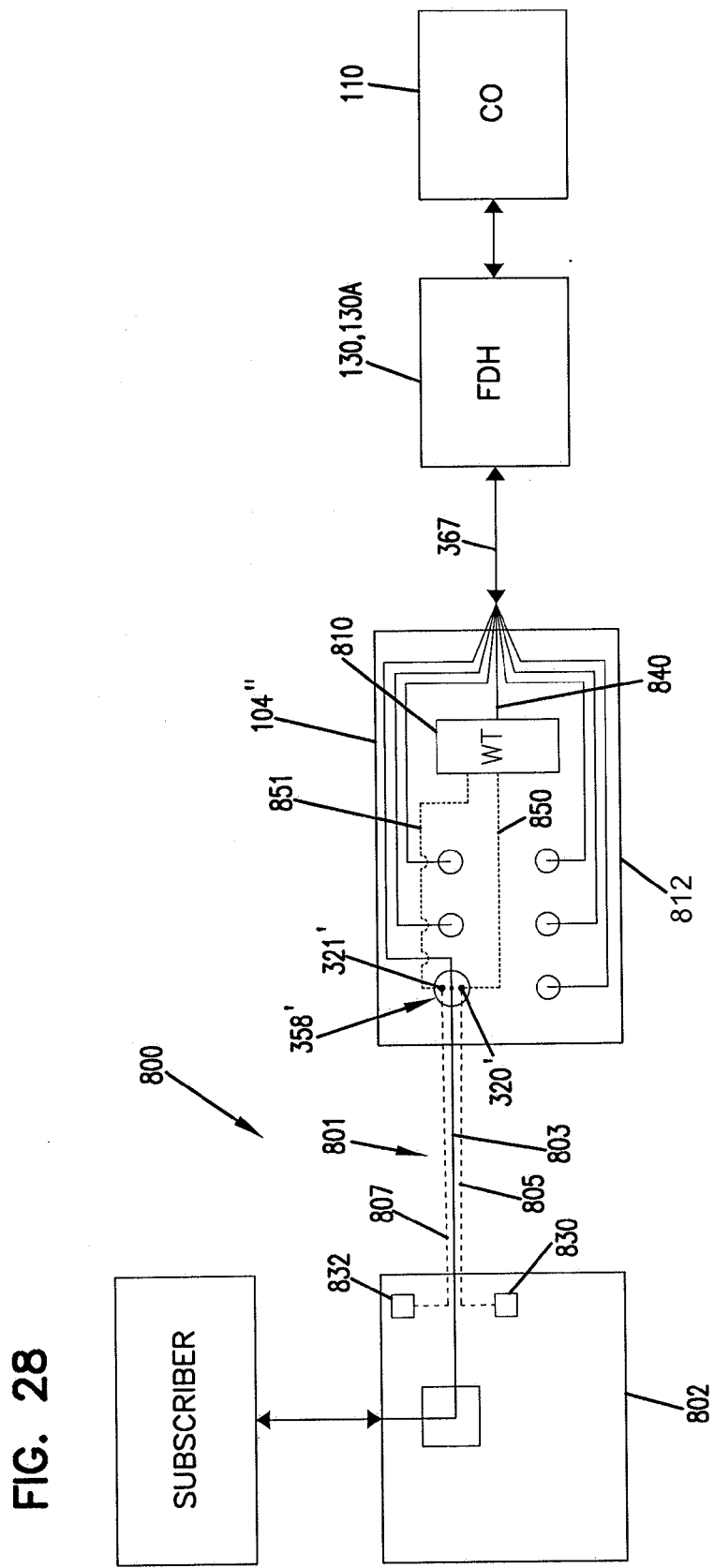
FIG. 28 is a schematic view of a fifth cable configuration for interconnecting a drop terminal, a wireless transceiver and a network interface device.

FIG. 28 shows a cabling system 800 having a cable 801 that provides an optical transmission line 803, a power transmission line 805 and a ground line 807 between an ONT 802 and a drop terminal 104". The cable 801 can have the same configuration as the first cable 701 of FIG. 25 and can include connectorized ends including connectors 390' that interface with adapters 358' provided at the ONT 802 and at the drop terminal 104". The power and ground contacts 320', 321' of the adapter 358' at the ONT 802 can be respectively connected to a power source 830 and a ground location 832.

The drop terminal 104" has the same configuration as the drop terminal 104' except an active wireless transceiver component 810 is mounted within an outer housing 812 of the drop terminal 104". One or more optical fibers from distribution cable 367 routed from the FDH 130, 130A to the drop terminal 104" are optically coupled to the wireless transceiver component 810 within the drop terminal 104" by one or more internal optical fibers 840. In this way, one or more fiber optic signals can be routed to the wireless transceiver component 810 from the FDH 130, 130A. Optical fibers of the distribution cable 367 are also linked to interior connectors mounted within the interior ports 364' of the fiber optic adapters 358'. Furthermore, the wireless transceiver component 810 is electrically connected to power and ground contacts 320', 321' of the adapter 358' of the drop terminal 104" by circuit paths 850, 851. Grounding and power pathways extend through the cable 801 from the ONT 802 to the adapters 358' on the drop terminal 104", and then from the adapter 358' through the circuit paths 850, 851 to the wireless transceiver component 810.

In certain embodiments, cabling configurations in accordance with the present disclosure may include cables that provide power to a wireless transceiver or other wireless device without providing separate grounding lines (e.g., the wireless device may be grounded through other means).

From the forgoing detailed description, it will be evident that modifications and variations can be made without departing from the spirit and scope of the disclosure.

What is claimed is:

1. A system for feeding power and signals to a wireless transceiver, the system comprising:
    a furcation member;
    a trunk cable extending to the furcation member, the trunk cable being configured to carry power and optical signals;
    a plurality of branch cables extending away from the furcation member, the plurality of branch cables including a first branch cable and a second branch cable, the first branch cable being optically coupled to the trunk cable at the furcation member, the first branch cable being terminated at a ruggedized optical connector, the second branch cable being electrically coupled to the trunk cable at the furcation member, the second branch cable being configured to carry power to the wireless transceiver; and
    a wireless transceiver to which the power and signals are fed, the wireless transceiver receiving the power from the second branch cable, wherein the wireless transceiver is disposed within an outer housing, wherein the outer housing includes a ruggedized optical adapter defining an external port accessible from an exterior of the outer housing, the ruggedized optical adapter also defining an internal port coupled to the wireless transceiver.

2. The system of claim 1, wherein the ruggedized optical connector includes an environmental seal for preventing moisture/water intrusion at a ruggedized optical adapter receiving the ruggedized optical connector.

3. The system of claim 2, wherein the ruggedized optical connector is structured and configured to be able to withstand a 100 pound axial pull-out force when coupled to the ruggedized optical adapter.

4. The system of claim 2, wherein the environmental seal includes an O-ring.

5. The system of claim 1, wherein the trunk cable and the second branch cable include a grounding line.

6. The system of claim 1, wherein the trunk cable includes an optical fiber carrying the optical signals, wherein the optical fiber is broken out from the trunk cable at the furcation member and directed along the first branch cable.

7. The system of claim 1, wherein the second branch cable also is configured to carry optical signals.

8. The system of claim 1, further comprising a drop terminal carrying a plurality of ruggedized optical adapters, each ruggedized optical adapter defining an exterior port, each ruggedized optical adapter also including a sealing member that provides an environmental seal between an exterior of the ruggedized optical adapter and the drop terminal when the ruggedized optical adapter is mounted at the drop terminal, wherein a ruggedized optical connector terminating one of the branch cables is plugged into the exterior port of one of the ruggedized optical adapters carried by the drop terminal.

9. A cable configuration for feeding power and signals to a wireless transceiver, the system comprising:
    a furcation member;
    a trunk cable extending to the furcation member, the trunk cable including a plurality of optical fibers to carry optical signals and an electrical conductor to carry power;
    a plurality of branch cables extending away from the furcation member, at least some of the branch cables including branch optical fibers coupled to the optical fiber of the trunk cable, one of the branch cables including the electrical conductor of the trunk cable;
    a ruggedized optical connector terminating one of the branch optical fibers, the ruggedized optical connector including an environmental seal for preventing moisture/water intrusion at a ruggedized optical port adapted for mating with the ruggedized optical connector;
    an optical transmission path extending along the trunk cable, through the furcation member, and along one of the branch cables that includes one of the branch optical fibers to the wireless transceiver;
    a power transmission path extending along the trunk cable, through the furcation member, and along the branch cable that includes the electrical conductor to the wireless transceiver;
    a wireless transceiver to which the power and signals are fed, the wireless transceiver receiving the power from the power transmission path and receiving signals from the optical transmission path, wherein the wireless transceiver is disposed within an outer housing, wherein the outer housing includes a ruggedized optical external port accessible from an exterior of the outer housing; and
    an optical adapter disposed at the outer housing, the optical adapter defining the ruggedized optical external port and also defining an internal port coupled to the wireless transceiver.

10. The system of claim 9, wherein the environmental seal includes an O-ring.

11. The system of claim 9, wherein the ruggedized optical connector is structured and configured to be able to withstand a 100 pound axial pull-out force when coupled to the ruggedized optical port.

12. The system of claim 9, wherein the trunk cable and the second branch cable include a grounding line.

13. The system of claim 9, wherein the branch optical fibers are broken out from the trunk cable at the furcation member and directed along the corresponding branch cables.

14. The system of claim 9, further comprising a drop terminal carrying a plurality of ruggedized optical adapters, each ruggedized optical adapter defining an exterior port, each ruggedized optical adapter also including a sealing member that provides an environmental seal between an exterior of the ruggedized optical adapter and the drop terminal when the ruggedized optical adapter is mounted at the drop terminal, wherein the ruggedized optical connector is plugged into the exterior port of one of the ruggedized optical adapters carried by the drop terminal.

15. A system for feeding power and signals to a wireless transceiver, the system comprising:
- a wireless transceiver disposed within an outer housing, the outer housing defining a ruggedized optical port accessible from an exterior of the outer housing, the outer housing also defining an internal port coupled to the wireless transceiver;
- a furcation member;
- a trunk cable extending to the furcation member, the trunk cable being configured to carry power and optical signals;
- a first branch cable optically coupled to the trunk cable at the furcation member, the first branch cable being terminated at a ruggedized optical connector; and
- a second branch cable electrically coupled to the trunk cable at the furcation member, the second branch cable being configured to carry power to the wireless transceiver.

\* \* \* \* \*